United States Patent [19]

Myers

[11] Patent Number: 5,751,289

[45] Date of Patent: May 12, 1998

[54] VIRTUAL REALITY IMAGING SYSTEM WITH IMAGE REPLAY

[75] Inventor: William Loring Myers, Boulder, Colo.

[73] Assignee: University Corporation for Atmospheric Research, Boulder, Colo.

[21] Appl. No.: 587,222

[22] Filed: Jan. 16, 1996

Related U.S. Application Data

[63] Continuation-in-part of Ser. No. 302,640, Sep. 8, 1994, Pat. No. 5,490,239, which is a continuation-in-part of Ser. No. 955,309, Oct. 1, 1992, Pat. No. 5,432,895.

[51] Int. Cl.$^6$ .................................................. G06F 15/00
[52] U.S. Cl. .................................... 345/419; 345/429
[58] Field of Search ............................ 395/119, 120, 395/121, 124, 125, 129, 130, 133, 505

[56] References Cited

U.S. PATENT DOCUMENTS

| | | | |
|---|---|---|---|
| 4,633,448 | 12/1986 | Koeijmans | 367/72 |
| 5,056,066 | 10/1991 | Howard | 367/72 |
| 5,095,521 | 3/1992 | Trousset et al. | 395/121 |
| 5,135,397 | 8/1992 | Yen | 434/2 |
| 5,153,858 | 10/1992 | Hildebrand | 367/72 |
| 5,177,474 | 1/1993 | Kadota | 340/729 |
| 5,184,306 | 2/1993 | Erdman et al. | 364/474.05 |
| 5,293,529 | 3/1994 | Yoshimura et al. | 345/158 |
| 5,313,567 | 5/1994 | Civanlar et al. | 395/124 |
| 5,317,689 | 5/1994 | Nack et al. | 395/505 |
| 5,396,583 | 3/1995 | Chen et al. | 395/127 |
| 5,490,239 | 2/1996 | Myers | 395/129 |

*Primary Examiner*—Phu K. Nguyen
*Assistant Examiner*—Cliff N. Vo
*Attorney, Agent, or Firm*—Duft, Graziano & Forest, P.C.

[57] ABSTRACT

The virtual reality imaging system takes a multidimensional space that contains real world objects and phenomena, be they static or dynamic in nature, and enables a user to define a point in and/or a path through this multidimensional space. The apparatus then displays the view to the user that would be seen from the point in and/or path through the multidimensional space. This view is filtered through user definable characteristics that refine the real world phenomena and objects to a perspective that is of interest to the user. This filtered view presents the user with a virtual view of the reality contained within this multidimensional space, which virtual reality presents data to the user of only objects, views and phenomena that are of particular interest to the user. The system also stores a plurality of states of the multidimensional space so that the user can replay the generated display or can modify the user selected point in and/or path through this multidimensional space and/or modify the user definable characteristics that define the filtered view.

28 Claims, 15 Drawing Sheets

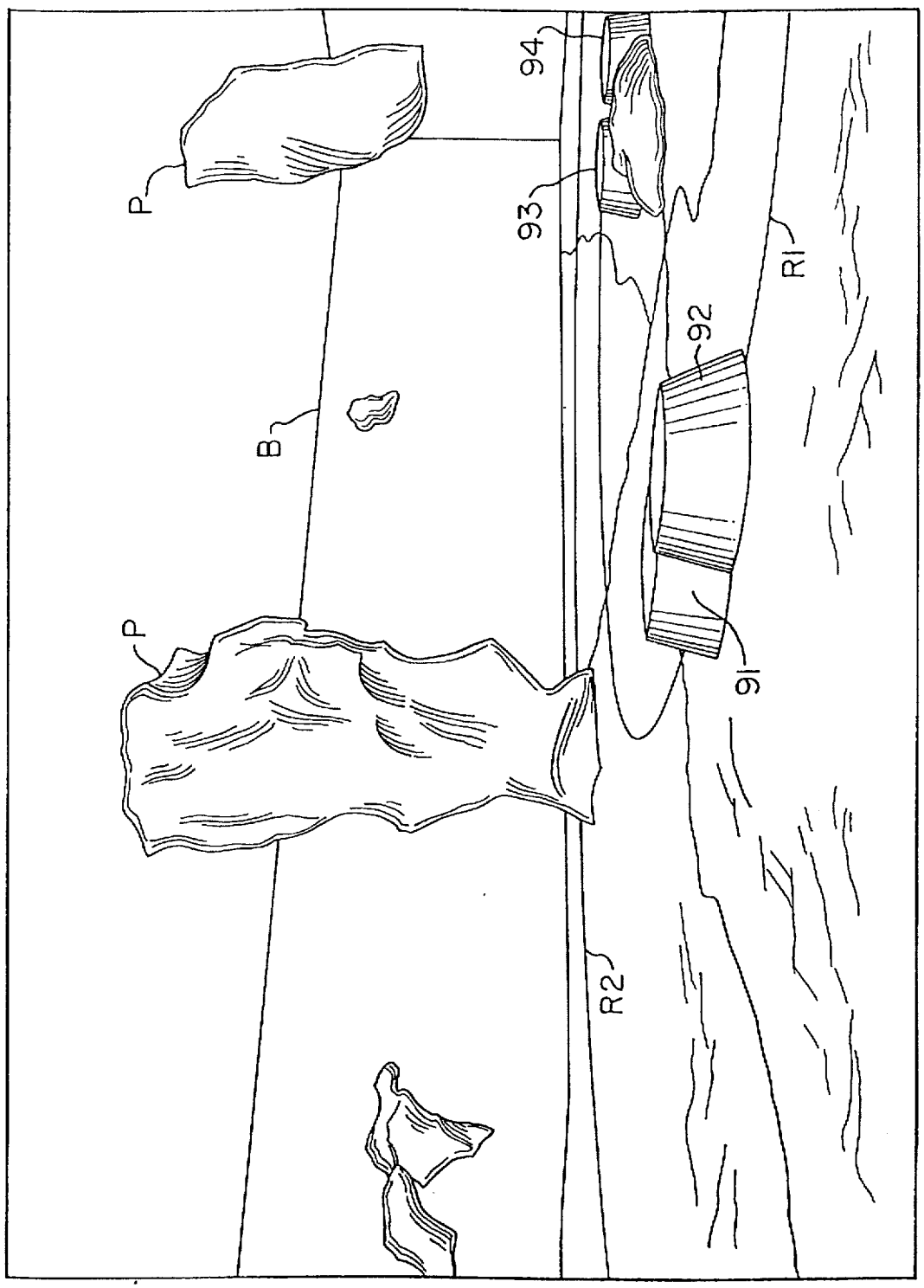

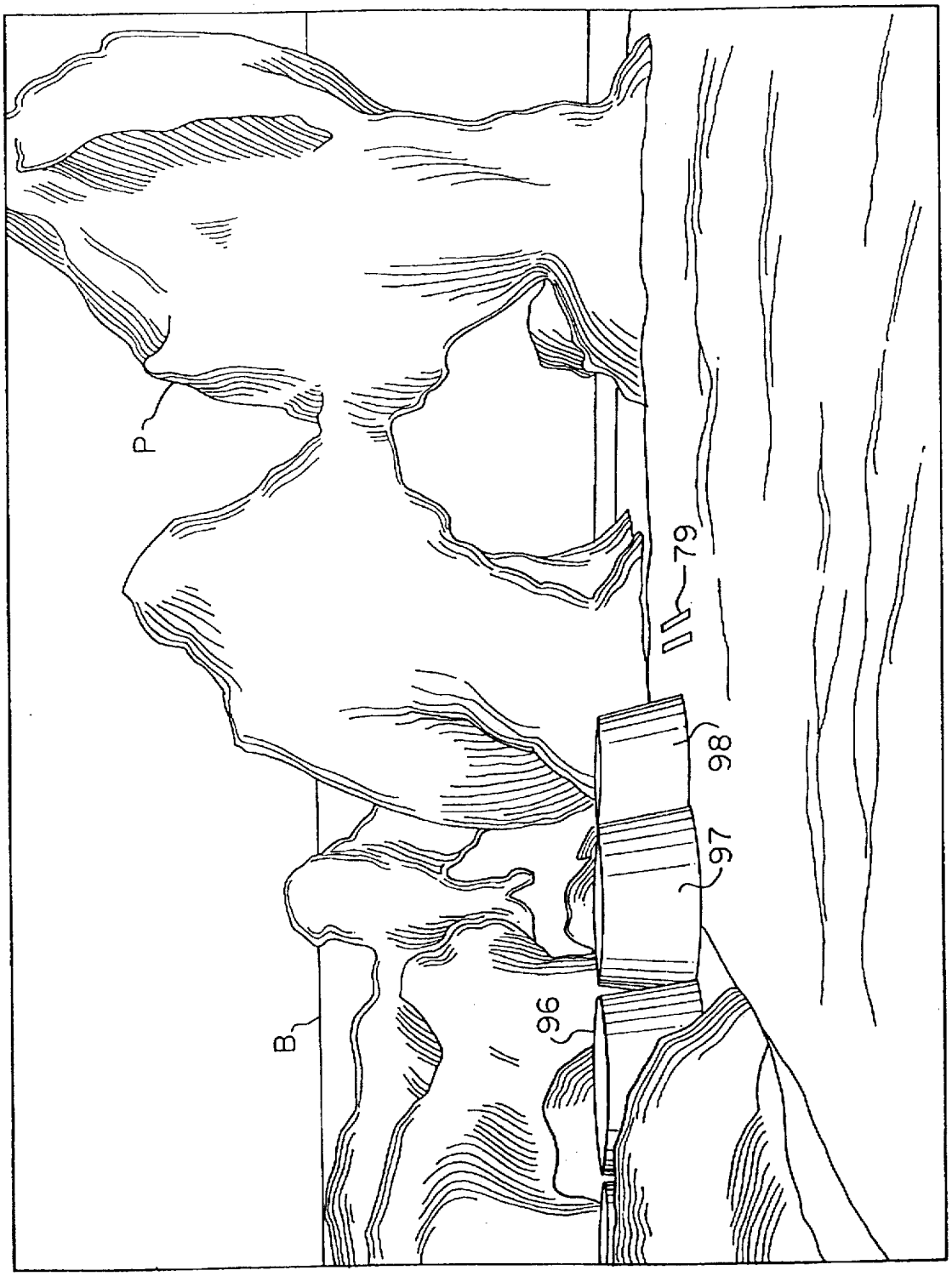

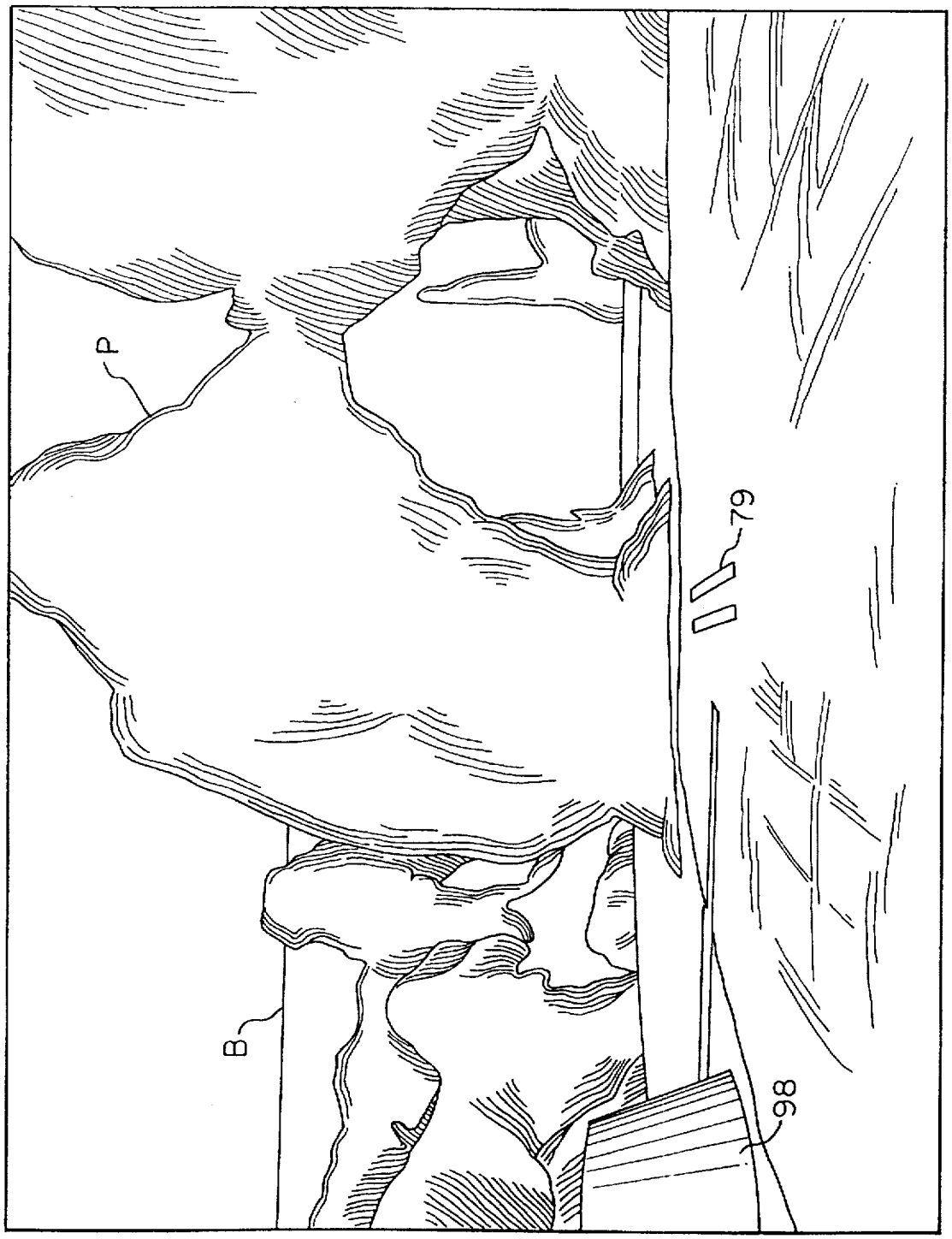

VIRTUAL REALITY IMAGING SYSTEM WITH IMAGE REPLAY

CROSS-REFERENCE TO RELATED APPLICATIONS

This application is a continuation-in-part of U.S. patent application Ser. No. 08/302,640, filed Sep. 8, 1994, now U.S. Pat. No. 5,490,239, titled Virtual Reality Imaging System, which is a CIP of U.S. patent application Ser. No. 07/955,309, filed Oct. 1, 1992, now U.S. Pat. No. 5,432,895, titled Virtual Reality Imaging System.

FIELD OF THE INVENTION

This invention relates to computer generated images and, in particular, to a system that creates a visual image of a multidimensional space to present a present and replay of past filtered images of various three dimensional phenomena and features that are contained within the multidimensional space as viewed from any predefined locus within the space.

PROBLEM

It is a problem in complex computer controlled systems that deal with real world phenomena to present a representation of the phenomena in a manner that is both informative to the user and in a simple presentation format. Computer generated graphics are ubiquitous and are typically used to present an accurate representation of an object, a phenomena, a multidimensional space and interactions therebetween. Computer generated graphics are also used extensively in simulation systems to present an image of a real world situation or a hypothetical situation to a user for training, analysis or other purposes. Computer generated graphics have become extremely sophisticated and can represent extremely complex and fanciful situations in a manner that is virtually lifelike. The application of computer graphics spans many technologies and applications.

One area in which computer graphics has yet to make a significant impact is the area of real time display of complex real world phenomena. Some elementary work has taken place in this area but systems of great flexibility and adaptability that can handle extremely complex phenomena are presently unavailable. This is because the volume of data that must be processed to present an accurate display represents a significant processing task and when coupled with a retirement to provide a display in real time, exceeds the processing capability of present processors. It is therefore a problem to visually display a complex multidimensional and real time phenomena in a large multidimensional space in a simple manner that maps the derived reality to a predefined user's viewpoint.

It is a further problem to provide a user with a replay of one or more images in a series of images since the storage and/or recreation of past images requires extensive memory and a significant processing capability. There are mass storage systems for the storage and retrieval of image data but these tend to be magnetic tape based, having a slow data retrieval speed and also without the capability of the user being able to modify the images that are presented as a result of the retrieval of the stored image data from the magnetic tape.

SOLUTION

The above described problems are solved and a technical advance achieved in the field by the virtual reality image generation system with image replay of the present invention. This apparatus takes a multidimensional space that contains real world objects and phenomena, be they static or dynamic in nature, and enables a user to define a point and/or a path through this multidimensional space. The apparatus then displays the view to the user that would be seen from the point and/or path through the multidimensional space. This view is filtered through user definable characteristics that refine the real world phenomena and objects to a perspective that is of interest to the user. This filtered view presents the user with a virtual view of the reality contained within this multidimensional space, which virtual reality presents data to the user of only objects, views and phenomena that are of particular interest to the user. This apparatus highlights, emphasizes, deletes, and reorients the reality contained within the multidimensional space to present an image to the user of only what the user needs to see to accomplish a stated task. The selective presentation of information in real time of real world phenomena enables the user to process the reduced data set contained in the image presented by this apparatus to perform a designated task in a manner that heretofore was impossible. In addition, the phenomena that is displayed is stored and processed in an efficient manner. The phenomena is reduced to a compact data representation to simplify the processing task and data communications. The image data that is stored in compact data representation form so that prior images in a sequence of images can be stored with a modest memory requirement. In addition the stored image data can be manipulated as the real time images to enable the user to modify the image generated from the stored image data and ultimately presented to the user. The use of the compact data representation reduces memory requirements and reduces the processor load.

The preferred embodiment of the invention described herein is that of an airport operations system wherein an airport is located in a predetermined location in a multidimensional space and is surrounded by various three dimensional topological surface features. The three dimensional air space surrounding the airport is typically managed by air traffic controllers to route aircraft in the vicinity of the airport into arrival and departure patterns that avoid the topological features, various weather conditions around the airport, and other aircraft that share the airspace with a particular flight. This problem is extremely complex in nature in that the multidimensional space around the airport contains fixed objects such as the airport and its surrounding topological features as well as dynamic phenomena such as meteorological events that are beyond the control of the air traffic controllers as well as dynamic phenomena, such as the aircraft, that can be indirectly controlled by the air traffic controllers. The dynamic phenomena vary in time and space and the movement of the aircraft within this multidimensional space must be managed in real time in response to real time and sometimes sudden changes in the meteorological phenomena as well as the position of other aircraft.

No known system even remotely approaches providing the air traffic controllers, the pilots or other potential users with a reasonable distillation of all of the data contained with the multidimensional space around an airport. Existing airport operations include a significant amount of data acquisition instrumentation to provide the air traffic controllers as well as the pilots of the aircraft with data relating to weather, air traffic and spatial relationships of the aircraft with respect to the airport and the ground level. The problem with this apparatus is that all of the data acquisition instrumentation is configured into individual units, each adapted to present one set of narrowly defined relevant information to the user with little attempt to integrate the plurality of systems into a universal instrument that can be adapted to controllably provide an image of the multidimensional space to the various users, with each image being presented to a user in terms of their specific need for information. This is especially important since the air traffic controller has a significantly different need for information than the pilot of the aircraft. The data output by these diverse systems varies greatly in both format and content and is not easily integrated into a single system that can represent the multidimensional space and its contents.

The apparatus of the present invention obtains data from a multitude of data acquisition sources and controllably melds this information into a database that represents all the information of interest relating to this multidimensional space. Graphic processing apparatus responds to user input to define a predetermined point or path (interactively or on a predefined basis) through the multidimensional space as well as certain visualization characteristics for each individual user. The graphic processing apparatus thence, in real time, presents the user with a customized view of the multidimensional space in a visual form by deleting information that is extraneous or confusing and presenting only the data that is of significant relevance to the particular user as defined by the filter. In an airport operation environment, low level wind shear alert systems (LLWAS) use ground-based sensors to generate data indicative of the presence and locus of meteorological phenomena such as wind shear and gust fronts in the vicinity of the airport. In addition, terminal doppler weather radar (TDWR) may also be present at the airport to identify the presence and locus of meteorological phenomena in the region surrounding the airport to enable the air traffic controllers to guide the aircraft around undesirable meteorological phenomena such as thunderstorms. Additional data is available in the form of LANDSAT data indicative of topological surface features surrounding the airport. This system can also use other digital image data such as aviation charts, road maps, night light imaging, etc. Air traffic control radar is also available to indicate the presence and locus of aircraft within the space around the airport for air traffic control purposes. Collectively, these systems provide data representative of the immutable characteristics of the multidimensional space as well as the dynamic phenomena contained in the air space, including meteorological events and aircraft operations. It is not uncommon for airport operations to take place in a zero visibility mode wherein the pilot's ability to obtain a visual image of air space in front of the aircraft is impaired to the point where the pilot is flying blind. Further, some aviation weather hazards are not detectable by the naked eye in clear air conditions, e.g., dry microbursts or turbulent regions. The pilot must rely on the air traffic controllers and radar contained within the aircraft to ensure that the pilot does not fly the aircraft on a collision course with a solid object, such as another aircraft or the topological features surrounding the airport.

The virtual reality imaging system of the preferred embodiment of the present invention converts the data obtained from the multitude of systems into compact data representations of the phenomena of interest to the user. These compact data representations from the various data collection systems can be merged and the information contained therein simply distilled into a visualization of the flight path presently in front of the aircraft. This apparatus can delete extraneous information, such as clouds, fog, etc. and illustrate to the pilot and/or the air traffic controller only phenomena that would be of significant interest to the pilot, such as dangerous meteorological phenomena and other aircraft, to present the pilot with a clear image of hazards within the multidimensional space to permit the pilot to chart a course through these hazards without the pilot being able to see these dangers with the naked eye.

The specific example noted above is simply one of many applications of this concept which operates to filter vast amounts of data typically found in a visual imaging situation to present a "clearer image" to the user as defined by the specific needs of the user. The user therefore sees only what they need to see and can complete tasks that heretofore were impossible due to the visual overload encountered in many situations, such as flying an aircraft through fog or clouds or not being able to identify a wind shear event in a meteorological phenomena of significant extent and complexity. An additional capability of this system is the prediction of future states of the dynamic phenomena. Data is collected by the multitude of data acquisition systems over a plurality of sampling intervals and can be extrapolated through trend analyses or through model simulations on the data available to illustrate the state of the dynamic phenomena in future sampling intervals. This capability enables the air traffic control supervisor to model the weather activity around the airport to provide information to plan airport operations for the immediate future.

In addition, the images presented to the user can be stored in memory in their compact data representation form and later retrieved by the user to produce a replay of these images or to produce a replay of the stored data in a modified form. The modified form can be the presentation of an image or series of images from a different perspective than that originally selected by the user. Alternatively, or in addition, the user may vary the filter characteristics to replay the images with a different set of filter characteristics. Other alternatives are available and these examples are simply illustrative.

BRIEF DESCRIPTION OF THE DRAWING

FIGS. 13–17 illustrate typical visual images produced by this apparatus;

DETAILED DESCRIPTION

Figure 1:
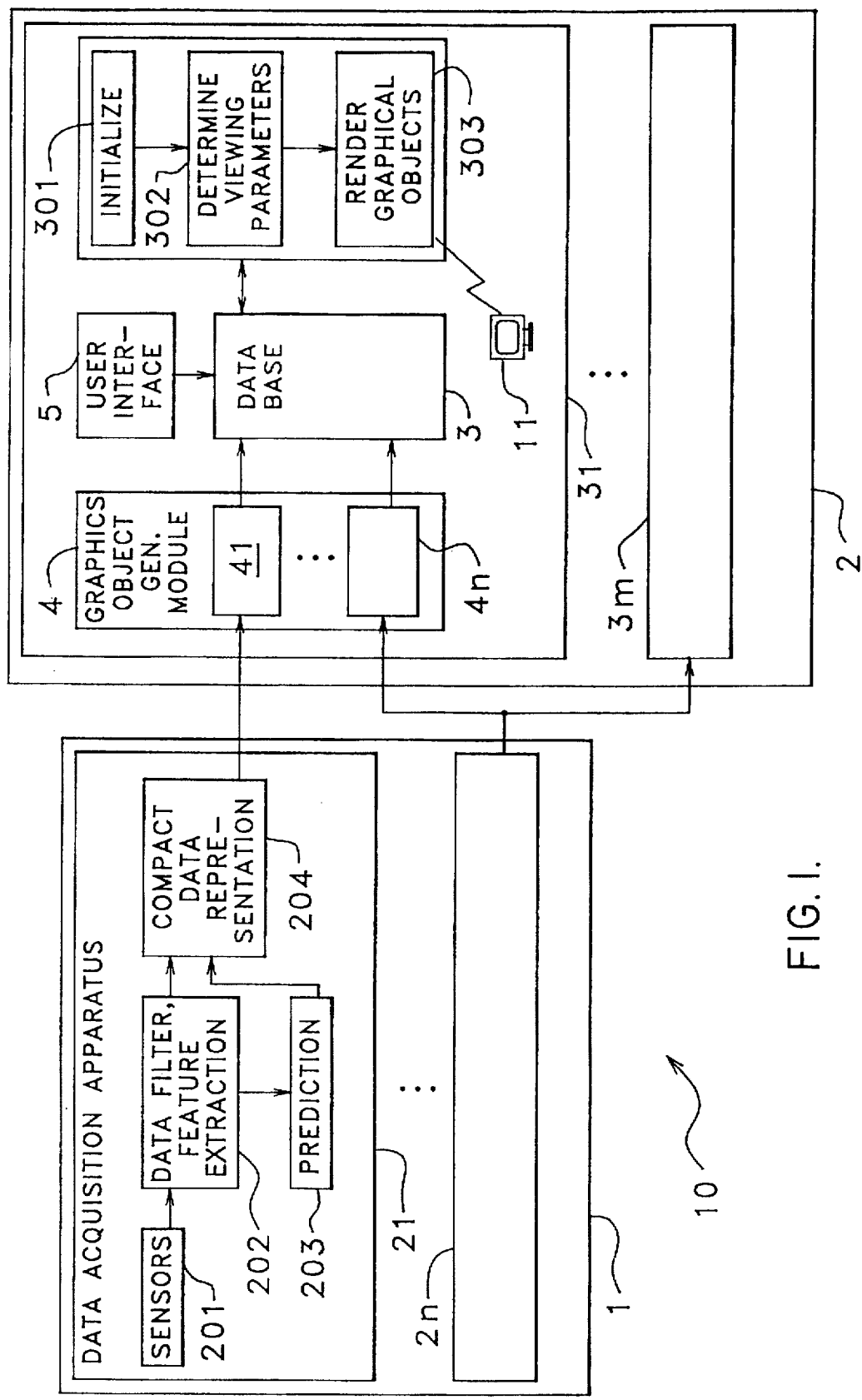
FIG. 1 illustrates in block diagram form the overall architecture of the apparatus of the present invention.

FIG. 1 illustrates in block diagram form the overall architecture of the virtual reality imaging system 10 of the present invention. Within the virtual reality imaging system 10, a data acquisition subsystem 1 functions to collect and produce the real time data that is representative of the multidimensional space and the features and phenomena extant therein. Graphics subsystem 2 functions to utilize the real time data that is produced by the data acquisition subsystem 1 to produce the visual displays required by the plurality of users. To accomplish this, a shared database 3 is used into which the real time data is written by the data acquisition subsystem 1 and accessed by the various processing elements of graphics subsystem 2. A user data input device 5 is provided to enable a user or a plurality of users to enter data into the graphics subsystem 2 indicative of the particular information that each of the plurality of users desires to have displayed on the corresponding display device 11.

In operation, the data acquisition subsystem 1 comprises a plurality of data acquisition apparatus 21–2n, each of which produces data representative of measurements performed on the phenomena or features that are located in the multidimensional space. These data acquisition apparatus 21–2n can process the real time measurement data into compact data representations of the phenomena and features, which compact data representations are transmitted to graphics subsystem 2 for processing into the visual images. The graphics subsystem 2 converts the compact data representations produced by the plurality of data acquisition apparatus 21–2n into visualizations as defined by each of the users of the virtual reality imaging system 100. This visualization is produced by performing a database transversal to present the data in a form and format of interest to each of the users.

Aviation Weather Display System

A typical application of this apparatus is an aviation weather display system whose data acquisition subsystems make use of a plurality of aviation weather instrumentation that are used in and about an airport installation. The aviation weather instrumentation may include ground based sensors such as radar, lighting detection networks, and wind sensors as well as airborne sensors, such as sounding balloons or aircraft based sensors. Each of the aviation weather instrumentation produces raw data indicative of real time meteorological phenomena, topological features and aircraft operations in the multidimensional space, which real time data is processed by the data acquisition subsystem 1 to produce compact representations of the real time data. These data processing steps often include filtering, feature extraction, and correlation/integration of more than one data stream. Furthermore, this processed data may be used as input to physically based models, which attempt to predict the evolving phenomena based on the stored measurements.

From the compact data representations, the graphics subsystem 2 generates generalized graphical representations of the phenomena and features. This involves the creation of an object or objects which exist in a virtual multidimensional space. In an aviation weather display application, this virtual reality imaging system 10 must operate in real time since significantly delayed data affects the validity and functionality of the system as a whole. The visualization presented to the user typically includes frame of reference information such as terrain, overlaid with identifiable features in the form of highways, range rings or icons representing municipalities or airports. Furthermore, the terrain surface can be colored by texture mapping it with an image such as a LANDSAT image or a digital map. This system can also use other digital image data such as aviation charts, road maps, night light imaging, etc. In order to integrate the plurality of data streams that are produced in a data acquisition subsystem 1, the graphics subsystem 2 must perform numerous operations such as database culling, relative level of detail determination and rendering to create user recognizable images from the raw data or compact data representations that are stored in database 3.

Data Acquisition Subsystem Architecture

FIG. 1 illustrates the major subcomponents of a typical data acquisition apparatus 21. In a typical configuration, a plurality of sensors 201 are used to make measurements during a sampling interval of predetermined duration and repetition frequency, of one or more characteristics of a particular phenomena or feature within the multidimensional space. The output signals from the plurality of sensors 201 are received by data filtering and feature extraction element 202 which functions to filter the data received from the plurality of sensors 201 to remove ambient noise or unwanted signal components therefrom. The data filtering, feature extraction element 202 also functions to convert the raw data received from the plurality of sensors 201 into a definition of the particular phenomena or feature that is being monitored by this particular data acquisition apparatus 21. An example of such a capability is the use of an improved low level wind shear detection apparatus which converts the wind magnitude measurements from a plurality of ground based sensors into data representative of wind shear events within the multidimensional space. To accomplish this, the raw data obtained from the sensors 201 must be converted into a form to extract the wind shear events from the plurality of wind measurements taken throughout the multidimensional space. The resultant information is used by compact data representation apparatus 204 to produce a set of data indicative of the extracted feature in a convenient memory efficient manner. This can be in the form of gridded data sets, feature extent and location data as well as other possible representations. Furthermore, the data acquisition apparatus can include a predictive element 203 which uses the data obtained from data filtering, feature extraction apparatus 202 to extrapolate into one or more predetermined future sampling intervals to identify a future temporal state of the feature or phenomena that is being measured. The data output by the predictive element 203 is also forwarded to compact data representation element 204 for inclusion in the data set that is produced therein. The resultant compact data representations are transmitted to the graphics subsystem 2.

It is obvious that if the feature being monitored is temporally and spatially static, the data that is produced is invariant and need not be updated during successive sampling intervals. However, most phenomena that are monitored in this environment tend to be temporally and in many cases spatially varying and the operation of the data acquisition apparatus 1 is on a time sampled basis, with a set of data being produced at the end of each sampling interval. The plurality of data acquisition elements 21–2n preferably operate in a time coordinated manner to produce synchronized sets of data sets in the database 3 so that graphics subsystem 2 can produce temporally coordinated views of the phenomena and features located in the multidimensional space on a once per sampling interval basis or over a plurality of sampling intervals, dependent on the amount of data that must be processed. In a real time environment, the plurality of data acquisition apparatus 21–2n function to collect tremendous amounts of data and reduce the data to manageable amounts for use by the graphics subsystem 2.

Figure 5:
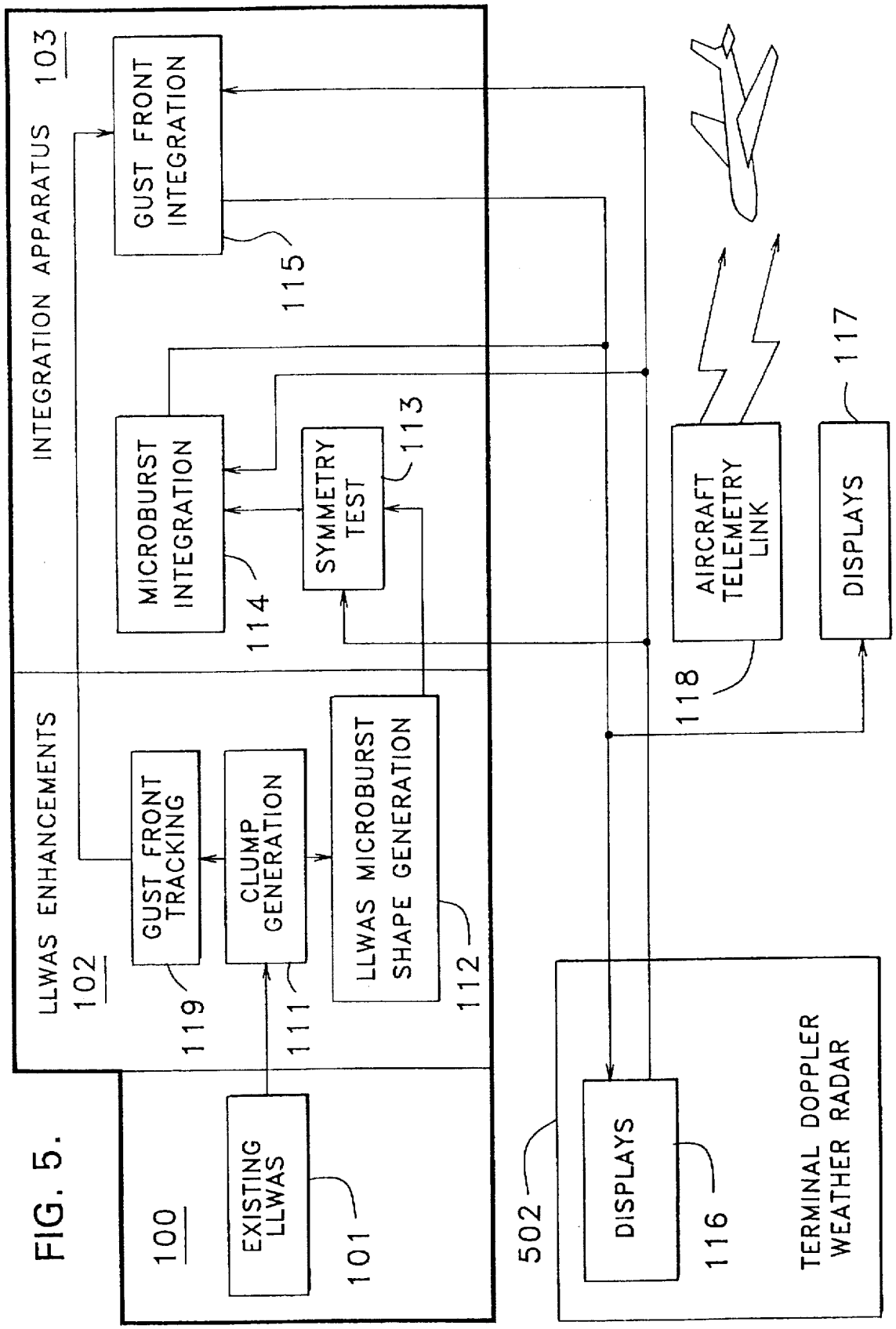
FIG. 5 illustrates in block diagram form the overall architecture of the improved weather alert system.

The improved low-level wind shear alert system, illustrated in block diagram form in FIG. 5, provides an improved method of identifying the presence and locus of wind shear in a predefined area. This low-level wind shear alert system enhances the operational effectiveness of the existing LLWAS system by mapping the two-dimensional wind velocity, measured at a number of locations, to a geographical indication of wind shear events. This resultant geographical indication is displayed in color-graphic form to the air traffic control personnel and can also be transmitted via a telemetry link to aircraft in the vicinity of the airport for display therein. In addition, gust fronts are tracked and their progress through the predefined area displayed to the users.

This low-level wind shear alert system can also integrate data and processed information received from a plurality of sources, such as anemometers and Doppler radar systems, to produce low-level wind shear alerts of significantly improved accuracy over those of prior systems. In particular, the apparatus of the improved low-level wind shear alert system makes use of the data and processed information produced by the existing Low-Level Wind Shear Alert System (LLWAS) as well as that produced by the Terminal Doppler Weather Radar (TDWR) to precisely identify the locus and magnitude of low-level wind shear events within a predetermined area.

This is accomplished by the use of a novel integration system that utilizes the data and processed information received from these two systems (LLWAS & TDWR) in such a way that the limitations of the two stand-alone systems are ameliorated. This integration scheme, while addressing these limitations, simultaneously maintains the strengths of the two stand-alone systems. This technique then provides the best possible wind shear hazard alert information. Furthermore, this integration methodology addresses the operator interaction problem discussed above. The integration is fully automated, requires no meteorological interpretation by the users and produces the required graphical and alphanumeric information in an unambiguous format. Lastly, this integration technique is implemented fully without any major software modifications nor without any hardware modifications to the existing stand-alone systems.

The TDWR apparatus uses a 5 cm. C-band Doppler radar system to measure radial winds when atmospheric scatterers are present. This system processes the radar return signals to create a field of radially oriented line segments indicative of the radial velocity data received from the radar. The TDWR apparatus bounds isolated sets of segments that are above a predetermined threshold to define an area which would contain a specific, potential low-level wind shear event. The bounding is such that it incorporates the smallest area which includes all of the line segments above the predetermined threshold. A predefined geometric shape is used to produce this bounding and the characteristics of this geometric shape are adapted in order to encompass all of the required data points in the minimal area.

The apparatus of the improved low-level wind shear alert system is divided into two independent sections: detection of wind shear with loss situations (microbursts, etc.) and detection of wind shear with gain situations (gust fronts, etc.). The TDWR system outputs wind shear with loss data in the form of microburst shapes. The enhanced low-level wind shear alert system generates equivalent LLWAS microburst shapes using the triangle and edge divergence values produced by the existing LLWAS apparatus. The LLWAS microburst shapes are validated by using auxiliary information from LLWAS and TDWR to eliminate marginal and false-detection LLWAS microburst shapes. The resultant two sets of microburst shapes are then considered for alarm generation purposes. The wind shear with gain portion of this system simply divides the coverage area into two regions, with TDWR producing wind shear with gain runway alarms for wind shear events that occur outside of the LLWAS sensor while the LLWAS runway oriented gain alarms are produced for wind shear events that occur inside of the LLWAS sensor network.

This integration architecture enables the concurrent use of a plurality of sensor-based systems to provide the wind shear detection function with increased accuracy. Both ground-based and aircraft-based sensor systems can be used to provide wind data for this apparatus. The mapping of diverse forms of input data into a common data structure (predefined geometric shapes) avoids the necessity of modifying existing sensor systems and simplifies the production of information displays for the user. The use of a common information display apparatus and format renders the combination of systems transparent to the user.

Improved Low-Level Wind Shear Detection System

Adverse weather conditions, especially those affecting airport operation, are a significant safety concern for airline operators. Low level wind shear is of significant interest because it has caused a number of major air carrier accidents. Wind shear is a change in wind speed and/or direction between and two points in the atmosphere. It is generally not a serious hazard for aircraft en route between airports at normal cruising altitudes but strong, sudden low-level wind shear in the terminal area can be deadly for an aircraft on approach or departure from an airport. The most hazardous form of wind shear is the microburst, an outflow of air from a small scale butpowerful downward gush of cold, heavy air that can occur beneath or from the storm or rain shower or even in rain free air under a harmless looking cumulus cloud. As this downdraft reaches the earth's surface, its spreads out horizontally like a stream of water sprayed straight down on at concrete driveway from a garden hose. An aircraft that flies through a microburst at low altitude first encounters a strong headwind, then a downdraft, and finally a tailwind that produces a sharp reduction in air speed and a sudden loss of lift. This loss of lift can cause an airplane to stall and crash when flying at a low speed, such as when approaching an airport runway for landing or departing on takeoff. It is therefore desirable to provide pilots with a runway specific alert when a fifteen knot or greater headwind loss or gain situation is detected in the region where the aircraft are below one thousand feet above ground level and within three nautical miles of the runway ends.

Figure 6:
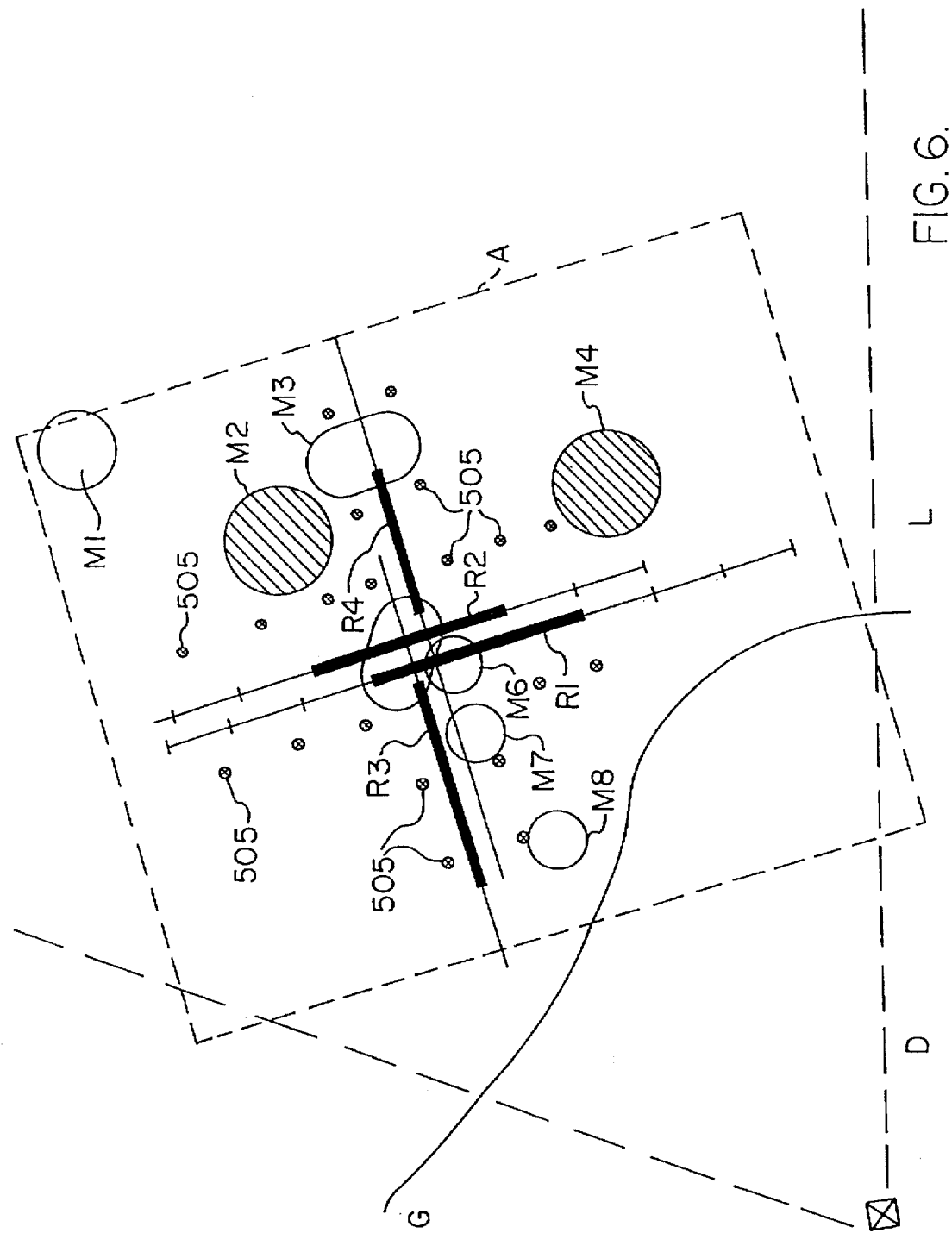
FIG. 6 illustrates a plot of a typical airport configuration, including LLWAS and TDWR installations and typical weather conditions.

FIG. 6 illustrates a top view of a typical airport installation wherein the airport is within the region indicated on the horizontal axis by the line labeled L and a Terminal Doppler Weather Radar system 502 is located a distance D from the periphery of the airport. Included within the bounds of the airport are a plurality of Low Level Wind Shear Alert System sensors 505. The sensors 505 are typically anemometers located two to four kilometers apart and are used to produce a single plane, two dimensional picture of the wind velocity within the region of the airport. The Terminal Doppler Weather Radar 502, in contrast, consists of a one dimensional (radial) beam which scans all runways (R1–R4) and flight paths but can measure only a radial horizonal outflow component of wind. The nominal TDWR scan strategy produces one surface elevation scan per minute and scans aloft of the operational region to an altitude of at least twenty thousand feet every two and a half minutes. This strategy is intended to provide frequent updates of surface outflow while monitoring for features aloft to indicate that a microburst is imminent. Microbursts (M1–M8) are recognized primarily by surface outflow although they can be anticipated to a certain extent by monitoring features and events in the region above the airport location.

Thunderstorms typically produce a powerful downward gush of cold heavy air which spreads out horizontally as it reaches the earth's surface. One segment of this downflow spreads out away from TDWR radar while an opposing segment spreads out towards the TDWR radar. It is generally assumed that these outflows are symmetrical for the purpose of detecting microburst wind shears. Because most microbursts do not have purely symmetrical horizontal outflows, the TDWR system can have problems detecting or estimating the true intensity of asymmetrical microburst Outflows. As can be seen from FIG. 6, the anemometers 505 of the Low level Wind-Shear Alert System are sited on both sides of airport runways R1–R4 but do not extend to the full three mile distance from the end of the runway as is desirable. Therefore, the anemometers 505 can only detect horizontal airflows that occur in their immediate vicinity (M2, M3, M5–M8) even though there can be horizontal airflow outside the anemometer network (M1, M4) that can impact airport operations but are outside of the range of the limited number of anemometers 505 sited at an airport.

Improved Wind Shear Alert System Architecture

FIG. 5 illustrates in block diagram form the overall architecture of the improved low-level wind shear alert system 100. This low-level wind shear alert system 100 integrates the ground level wind data collected by one set of stationary ground level sensor (anemometers) 505 with the higher altitude wind data collected by a second sensor (Doppler radar) 502 in order to accurately identify both the locus and magnitude of low-level wind shear conditions within a predetermined area A. The two sets of data inputs illustrated in this embodiment of the invention include the data produced by existing data processing systems associated with the sensors in order to preprocess the data prior to integration into the unified precise output presented to the end user.

The sensor systems include the existing Low Level Wind Shear Alert System (LLWAS) front end processing 101 which is an anemometer-based wind shear alert system used to detect the presence and identify the locus of wind shear events at or near ground level. The LLWAS system 101 generates data indicative of the wind velocity (magnitude and direction) at each of a plurality of fixed sites 505 located within a predefined area. The collected wind velocity data is then preprocessed by the LLWAS system 101 to identify the locus and magnitude of wind shears at ground level by identifying the divergence or convergence that occurs in the measured wind velocity throughout the predefined area. Similarly, the second set of sensors is the Terminal Doppler Weather Radar (TDWR) 502 which uses a Doppler radar system to measure low-level wind shear activity in the predefined area. The TDWR system 502 searches its radar scan for segments of the radar beam of monotonically increasing radial velocity. These regions and areas of radial convergence are identified as the locus of wind shear events.

The integration system 103 that has been developed for the integration of TDWR 502 and LLWAS 101 uses a product-level technique and is divided into two independent sections: the detection of windshear-with-loss situations (microbursts, etc.) and windshear-with-gain situations (oust fronts, etc.).

The outputs from the windshear-with-loss portion of the TDWR system 502 are microburst shapes—which are used both as graphical information and to generate the textual runway alerts. As an integration "add-on" to the existing LLWAS system 101, an enhanced LLWAS section 102 was developed to generate LLWAS microburst shapes. These shapes are computed using triangle and edge divergence values obtained from the LLWAS system 101. Even though the methods used to generate these shapes is quite different, these LLWAS microburst shapes are identical—in both form and content—to the TDWR microburst shapes. This allows for the same alert-generation logic to be applied, and for the common graphical display 116 of microburst detections.

The TDWR/LLWAS (windshear-with-loss) microburst integration 114 is essentially the combined use of microburst shapes from each subsystem 112, 502. This combination, however, is not a spatial merging of the shapes: each shape is considered as a separate entity. Furthermore, the LLWAS microburst shapes have been passed through a validation process in symmetry test 113. By this we mean that auxiliary information 703 from both TDWR and LLWAS is utilized in an attempt to eliminate certain of the "weaker" LLWAS microburst shapes—ones that could generate nuisance or false alarms. The motivation and implementation for this procedure is described below. However, an alternative to this process, the sensor data from each of the sub-systems 112, 502 could be merged to produce a composite set of shapes indicative of the merged data. This alternative process is noted herein in the context of this system realization.

Once a set of microburst shapes are produced by the enhanced LLWAS apparatus 102 and integration apparatus 103, these shapes are transmitted to the Terminal Doppler Weather Radar system 502 which contains the runway loss alert generation process. Similarly, the integration apparatus 103 receives LLWAS runway oriented gain data and TDWR gust front data in gust front integration apparatus 115. The LLWAS runway-oriented-gain data includes data front tracking system 119 which uses the LLWAS anemometer wind vectors to detect, track, and graphically display gust-fronts within the predetermined area. LLWAS runway-oriented-gain (ROG) is also used for detection of generic wind shear with gain hazards within the LLWAS network. This is not necessarily tied to a specific gust front detection. Wind shear with gain situations can occur independently of gust fronts—e.g. the leading edge of a microburst outflow, or larger-scale (meteorological) frontal passage. The selected data is then transmitted to the TDWR system 505 where a runway gain alert generation process produces an alarm indicative of the presence of a wind shear with gain hazard.

Alarm arbitration process in TDWR system 502 selects the alarm produced by either runway loss alert generation process or runway gain alert generation process to present to TDWR displays 116. The existing displays 116 consist of the TDWR Geographic Situation Display (GSD) which illustrates in graphical form the microburst shapes, gust fronts and indicates which runways are in alert status. The TDWR and LLWAS Ribbon Display Terminal (RDT) gives an alphanumeric message indicating alert status, event type, location and magnitude for each operational runway.

It is obvious from the above description that the existing LLWAS 101 and TDWR 502 systems are utilized as much as possible without modification to minimize cost and impact on existing installations. It is also possible to implement these features in other system configurations. Any other data collection system can be similarly integrated with the existing TDWR system 502 or the existing LLWAS system by the application of the philosophy described above. For example, the addition of another Doppler radar, or another anemometer network.

Shape Generation Philosophy

The LLWAS microburst shape computations are based upon the detection of divergence in the surface winds. These triangle and edge divergence estimates are mapped onto a rectangular grid. Contiguous "clumps" of above-threshold grid points are collected and then used to generate microburst shapes. Compensating for the spatial under-sampling of the true surface wind field inherent in the LLWAS data, a "symmetry hypothesis" is used in generating the location, extent, and magnitude (loss estimate) for these microburst shapes. This hypothesis is applied as if a symmetric microburst were centered at each (above threshold) grid point. In general, microburst outflows are not symmetric. However, the spatial superposition of these symmetric "grid-point-microbursts" in a given clump does a very good job of approximating a non-symmetric event.

While a given detected divergence may be real, the LLWAS data alone cannot be used to determine whether it is truly associated with a microburst. Therefore, the application of the symmetry hypothesis may not always be valid. The problem is two-sided. If the symmetry hypothesis is always used, it could generate false alarms in certain non-microburst situations. For example, strong surface winds setting up in a persistent divergent pattern. On the other hand, if the symmetry assumptions are never used, wind shear warnings for valid microburst events could be delayed, inaccurate, or even eliminated. The issue is then to determine whether a given LLWAS-detected divergence is associated with a microburst and hence determine whether the symmetry hypothesis should be applied.

The algorithm that was developed combined "features-aloft" information from TDWR: three-dimensional reflectivity structures and microburst precursors, (both projected down to the surface); and detected "strong" surface divergence (microburst shapes) from both TDWR 502 and LLWAS 101. This information is then synthesized, both spatially and temporally to create a set of geometric discs. The intent of these discs is to indicate a region of the atmosphere within and/or above the disc, (i.e. a cylinder), where there is good likelihood of microburst activity. This "region" could be in space: the detection of the surface outflow, or microburst features above the surface (reflectivity and/or velocity signatures). It could also be in time, that is, a microburst is either: going to occur, is in progress, or has recently been present.

These discs are then examined for "closeness" to those LLWAS microburst shapes that are to be validated. If this proximity criteria is met, the LLWAS microburst shape is "validated" and passed onwards. That is, the use of the symmetry hypothesis is assumed to be appropriate in this case, and this LLWAS microburst shape is to be used for generating wind shear warnings and to be displayed on the GSD. If the proximity test fails, the LLWAS shape is discarded. However, in this latter circumstance, there could be a valid wind shear hazard occurring that is not associated with a microburst—or possibly a microburst that is not being correctly identified in the symmetry disc calculations. To prevent this type of missed detection, the LLWAS Runway-Oriented-Loss (ROL) information 703 is then used as a fall-back to generate any appropriate wind shear warnings.

Enhanced LLWAS System-Preprocessing

Figure 3:
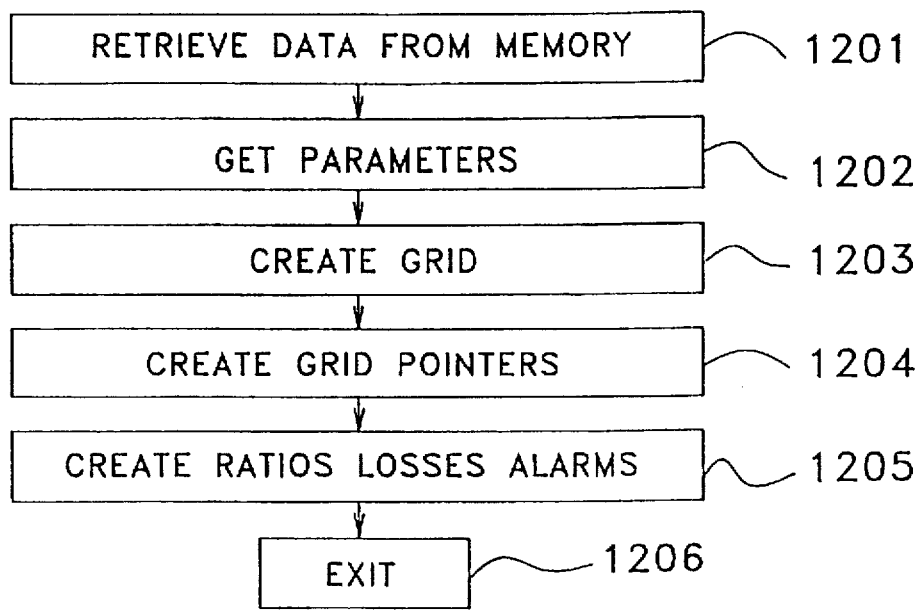
Figure 4:
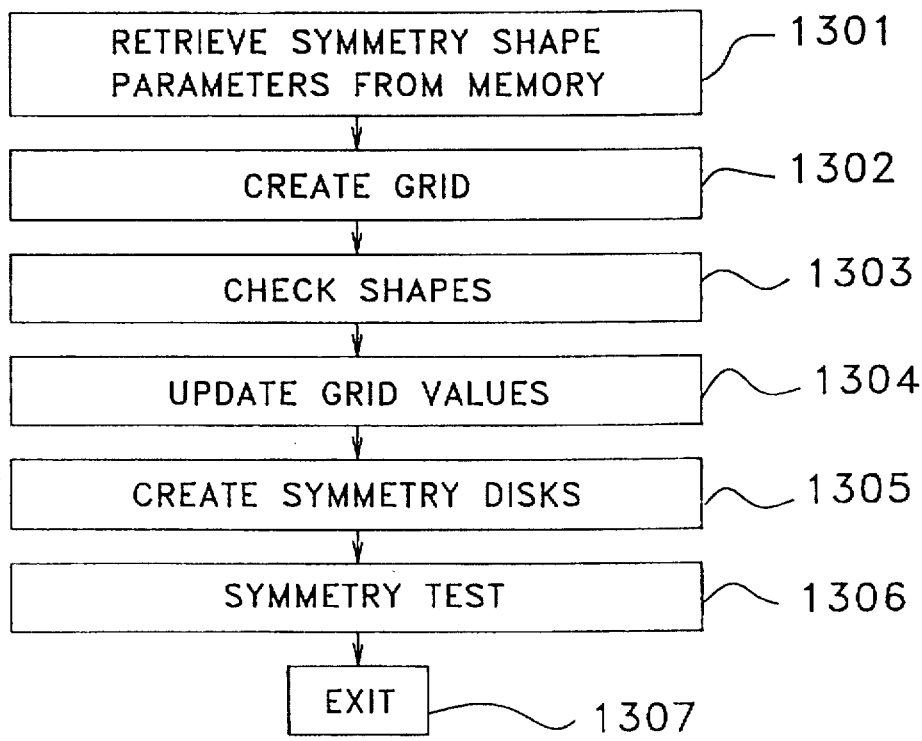

The enhanced LLWAS system creates a grid point table for use in creating microburst shapes. This process is illustrated in FIG. 3 and is activated at system initialization. As a preprocessing step, a set of pointers are generated which map triangle and edge microburst detection areas to an analysis grid. During real-time operation, LLWAS triangle and edge divergence values are then mapped onto the grid—applying a magnitude value at each grid point. This set of grid point magnitudes are used with the clumps produced by clump shape generation apparatus 111 to generate a set of low level wind shear alert system microburst shapes. The "pointers" for the mapping of triangle and edges to the grid is a "first-time-through", preprocessing step. This is done this way since the "pointer" information is solely a function of a given site's LLWAS anemometer network geometry-which doesn't change.

The preprocessing, location specific table data generation is initiated at step 1201 where the anemometer location values are retrieved from memory and, at step 1202 the site adaptable parameters needed to modify the calculations are also retrieved from memory. At step 1203, a grid is created by computing the number of grid points in an x and y Cartesian coordinate set of dimensions based on the number of input data points to create a minimal size xy grid to perform the computations. At step 1204, a set of grid pointers is produced to map the divergence estimates that are above a threshold value with the particular points in the grid system created at step 1203. This is to locate the center of a microburst that would be causing an alarm. Since a number of grid points are above the divergence element threshold value it is difficult to denote the location where the microburst to be centered which would cause these elements to create the alarm. Each sensor or network element is tested by placing a mathematical microburst at each grid point and each one of the grid points so tested that would cause the given network element to be an alarm status is then associated with that particular network element. As a result, a set of grid points associated with each Low Level Wind Shear Alert System 101 triangle and edge is produced to create the element grid point pointers. In order to perform this calculation, a symmetrical microburst model is used: a simplistic half sine wave model which is time invariant and symmetric in both space and magnitude and is only a function of amplitude and a maximum radius. Even though a real microburst may be spatially asymmetrical, it can be approximated by a linear superposition of a number of symmetrical microbursts at least to a first order mathematical expansion which produces sufficient specificity for this calculation process. Once the above steps have been performed, the processing of measurement data begins at step 1205, where the Low Level Wind Shear Alert System triangle and edge divergence values are used to generate the corresponding sets of ratios of the divergence values to the thresholds, estimated loss values and alarm status. Associated with these grid points are two sets of magnitude values: the low level wind shear alert system divergence to threshold ratios and associated estimated loss values. The purpose of these two sets of magnitude information lies in the fact that, although the measured quantity is wind-field divergence (or windshear), the required output value to the users is a runway-oriented loss value. Hence a mapping from divergence to loss is needed.

The following data processing steps are done at each update of information from the LLWAS system:

1. Input of triangle and edge divergence values from LLWAS system.
2. Computation of "ratios" (divergence/threshold) for each triangle and edge.
3. Mapping of triangle and edge ratios to grid.

4. Clumping, of grid points.
5. Shape generation from clumps.

Clump Generation Theory

Figure 2:
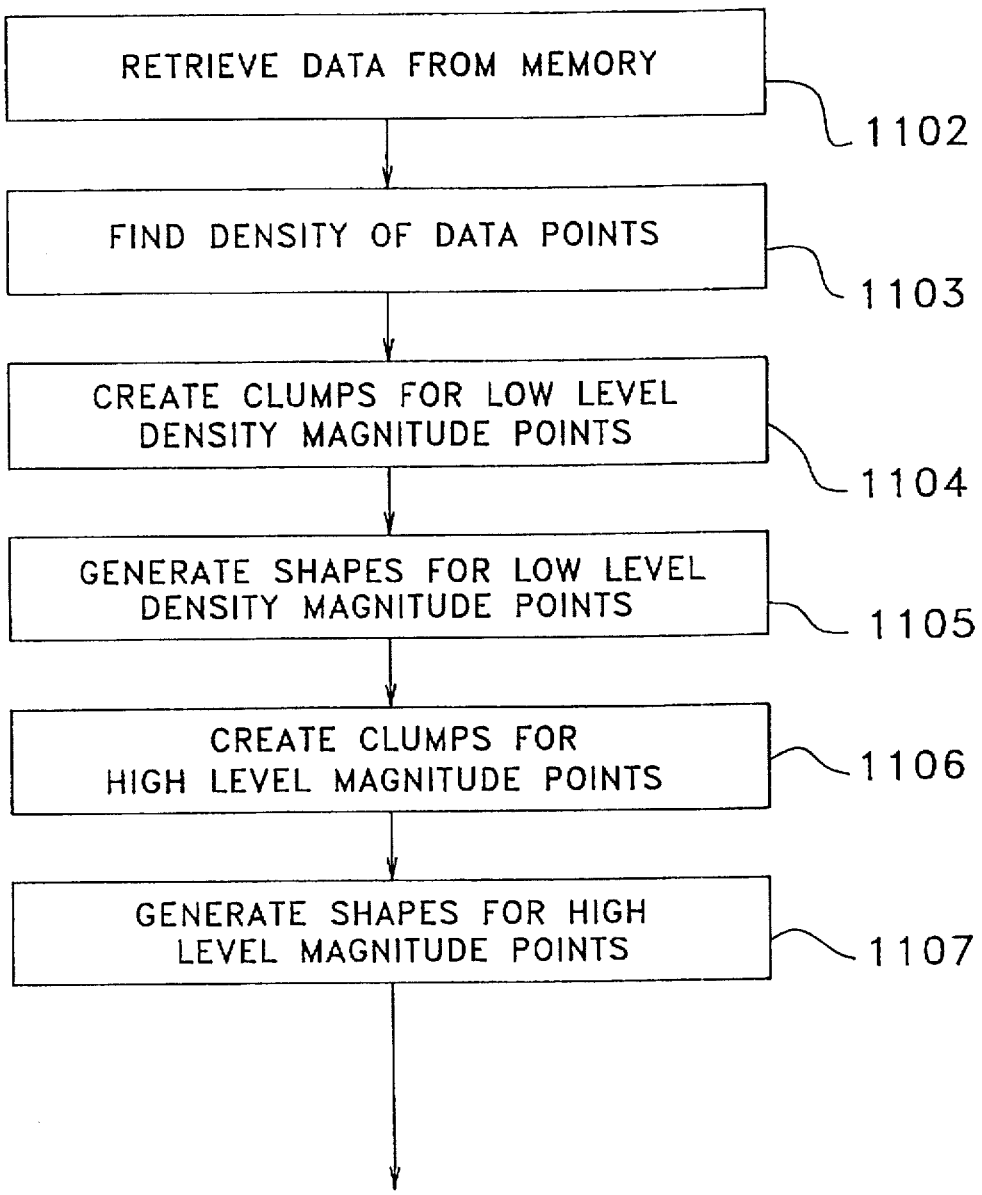
FIGS. 2–4 illustrate in flow diagram form the operation of the various segments of the improved weather alert system.

FIG. 2 illustrates in flow diagram form the clump generation process 111 which receives algorithm products from the Low Level Wind Shear Alert System 101 to produce an indication of the location of wind shear events. This routine accepts as an input the triangle and edge divergences produced by the Low level Wind Shear Alert System 101. The clump generation process 111 then generates clumps of points that are above a certain input threshold level. These clumps are then output to the low level wind shear alert system shape generation algorithm 112. The grid points are the data collection points within the predefined area around the airport which area is presumed to be two dimensional rectangular area having a set of coordinates in the standard two dimensional rectilinear mathematical orientation with positive x values to the east and positive y values to the north. The clumps are generated by first finding grid points that are above a given threshold value.

In the pre-processing stage, a grid with 0.5 km by 0.5 km spacing is constructed over a region which covers the anemometer network 505. A simulated microburst is placed at each grid point and the divergence is computer for each network element. If the computer divergence for a given element is above that element's threshold, an "association" is made between the grid point and that element. In this manner, a table is constructed that connected all of the grid points to the network triangles and edges via a hypothetical divergence detection. This table is then employed in real-time using an inverse logic. Given that a network element detects a divergence above its threshold, a set of grid points (via the table) is associated with that divergence, since from the theoretical analysis these points are potential microburst locations.

Once these subsets of grid points have been identified, they are processed to generate "clumps" of contiguous groups of grid points. By contiguous, it is meant that adjacent up, down, right, or left points are considered, not those along the diagonals. Three sets of clumps are generated to include grid point threshold data representative of "low-level", "high level", and "low-level-density" collections of grid points. The "low-level" and "high-level" grid points are indicative of the magnitude of the estimated wind divergence at those particular grid points. The "high-level" grid points are representative of a secondary threshold used to distinguish the grid points that have significantly exceeded the initial threshold. This secondary threshold thereby differentiates wind shears of significant magnitude from those of moderate magnitude.

"Low-level-density" grid-point clumps are identical to those for the low level and high level process discussed above but represent a condensation of a large number of grid points, which number would be overly large or the resultant geometric pattern would be concave or extended in nature. An example of such a problem would be a collection of grid points that are located in a figure eight shape. In order to reduce the collection of grid points into small, convex and compact patterns, a density weighing operation is performed on the low level grid point values. In order to accomplish this, the original magnitude of each grid point is multiplied by a local neighborhood occupation density weight to compute a new magnitude value at each grid point to thereby more accurately reconfigure the geometric pattern of these grid points. The density weight is a normalized value between zero and one which is generated by any one of a number of mathematical methods depending upon a given point's location in the grid. For example, the neighborhood set of points for a given interior point are the eight adjacent points including the diagonals and the given point itself. The number of points in this set that are above a threshold value are summed and this total number is divided by the number of grid points that are in the original neighborhood set. These density weighted points are then formed into clumps in an identical fashion as for the low level and high level computations to form the low level density geometric clumps. This procedure condenses the collection of grid points into more compact patterns and also separates overly extended clumps into a set of smaller, compact clumps.

Preferred Geometric Shape

A single preferred geometric shape is used throughout these computations in order to have consistency and simplicity of the calculations. The preferred shape disclosed herein is a semi-rectilinear oval akin to the shape of a band-aid, that is a rectangle with semi-circle "end-caps" (these microburst shapes are the same as the TDWR shapes). This shape is mathematically defined by an axis line segment having two end points and a radius used at each of the end points to define a semicircle. This geometric shape is produced for each clump such that the axis line segment has the minimum weighted squared distance from all of the grid points that are within this given clump and furthermore, this shape encloses all of the clump's grid points. In cases where the shape is overly large or concave in nature, the shape is processed to create a number of smaller shapes which enclose the grid points. This shape is produced such that it is of minimum area after satisfying these conditions. A further processing step, a least-squares size reduction, is then performed to "trim" overly large shapes. In computing the shapes for microbursts, the magnitude information used is the ratio of the calculated divergence to the threshold that is mapped from triangles and edges into the grid points. A given grid point's ratio value is generated as follows. First, a ratio for each LLWAS network element: (triangle and/or edge), is computed. This ratio is the ratio of that elements' detected divergence estimate and that elements' divergence threshold value. This predetermined threshold is designed to indicate hazardous wind-field divergence, is computed based upon a mathematical microburst simulation, and takes into account the geometrical nature of the given triangle or edge. Another set of magnitude information used is an associated loss value estimate for each point, based on these divergences. The microburst shapes are calculated at the "wind shear alert" (WSA) level using the low level density clumps, least squares shape size reduction and the statistical shape magnitude computation. The other set of geometric shapes is at the "microburst alert" (MBA) level using the high level clumps, least squares reduction and the maximum value of magnitude computation.

Clump Generation Process

FIG. 2 illustrates in detailed flow diagram the clump generation process 111 which process is initiated at step 1102 where the data is received from the associated low level wind shear alert system 101 and stored in memory. At step 1102, the clump generation process 111 converts the low level magnitude points into local occupied neighbor density weighted magnitude values. This process as discussed above uses all of the low level input magnitude values and computes new values for these points based on the density of adjacent data points that have exceeded the initial predetermined threshold. Each given data point that is above the input threshold value is given a density weight which is a number between zero and one indicative of the number of contiguous grid points, including the given point that are above the input threshold value, divided by the total number of contiguous points. That is, for an interior point the density weight is the number of neighboring points above the input threshold value divided by nine. This is because the contiguous points is defined as the adjacent points to the left, right, up, down and the four diagonal points in this xy Cartesian coordinate system. Once this set of density weighted values have been computed, processing advances to step 1104 wherein the initial groupings of data points is accomplished by grouping the grid points that have exceeded the threshold value into contiguous groupings. Concurrently with the operations on low level density data points, or subsequent thereto, the steps 1105 and 1106 are executed on the high level magnitude points to perform the same contiguous grouping function of steps 1102 and 1103. The set of groupings is then used at step 1106 by the shape driver to generate the predetermined geometric shapes of minimum area.

Using points that are still inside the shape after radius reduction compute the least squares reduced axis segment to produce a new reduced axis line segment. The resultant reduced shape axis line segment is then converted into the original, non-rotated Cartesian coordinate system and the overall magnitude for the shape is computed. The resultant shape consists of a line whose end points represent the center of a semicircle of predetermined radius which end point semicircles when connected by straight line segments create a band-aid shape to enclose all of the data points in a minimal area whose magnitude has been calculated. Similar processing of the input data takes place for the high level magnitude points in steps 1106 and 1107 the processing of which can occur sequentially or in parallel with the operation of steps 1104 and 1105. Once the shapes and their magnitude have been calculated for both the low level density magnitude points and the high level magnitude points processing exits at step 1109.

Shape Production

As noted above, this predetermined geometric shape is a band-aid shape which is defined by an axis line segment having two end points and a radius used at the end points to produce two semicircular shapes. This process is illustrated in flow diagram form in FIG. 3. The process is initiated by retrieving all of the grid points in one of the above noted sets and storing these in memory. Using these stored grid points, the measured or calculated magnitude of each grid point in a clump is normalized. Once all of the grid point values in the set have been normalized, a weighted least squares line is fit through these points using a standard weighted least squares technique. This produces the best line fit through all of the valid points in the input set of grid points. Once the weighted least squares line has been produced, the ends of this line segment are calculated by projecting all of the data points in the set onto the computed least squares line. The process uses the coordinates of each of the data points and the slope of the computed least squares line through these points. The coordinates of the clump points are put into a rotated coordinate system such that the least squares line is horizontal. The output from this calculation is the clump point coordinates in this rotated system and the axis line segment end points also in this coordinate system. The first set of coordinate values of this rotated end point is the leftmost point on the line representative of the smallest x value in the rotated xy Cartesian coordinate system and the second coordinate output is the rightmost point representative of the largest x value in this Cartesian coordinate system. Once the ends of the shape line segment have been determined all of the subsequent computations are done in the rotated coordinate system. The radius of the shape that encloses the points and is of minimum area is calculated by using a one dimensional smooth-function, (i.e., monotonic) minimization routine.

Shape Area Minimization

The minimization function is then activated to compute the radius that minimizes the shape area and using this new radius a review is made to determine whether the axis line segment end points can be modified in view of the determined radius. This is done by projecting the valid data points in the current set onto the computed least squares line and computing new end points as discussed above. Once this is done, the axis length is reduced if possible by moving the axis end points towards the axis segment barycenter using a weighted least squares reduction of the horizontal distance from clump points to the closest shape boundary. By closest, it is meant that these points are partitioned into three sets: a set whose x values are less than the shapes barycenter, a set whose x values are greater than the shapes barycenter and a set of points that were originally associated with the shape but after radius reduction are now outside the shape. The normalized weights are selected to be a function of points magnitude and its distance to the axis segment barycenter. The process uses the current access line segment end points and computes the barycenter of the current axis line segment and initializes the minimization iteration interval.

If the shape so generated is too large, it is dissected into a plurality of shapes. The test of excessive size is that the length of the axis line segment plus twice the radius is greater than a predetermined threshold. If so, the axis line segment is divided into smaller and potentially overlapping pieces. The grid data points originally associated with the original clump are then associated with the corresponding subshapes. If there is an overlap of the multiple shapes, the grid data points can be associated with more than one shape. The resultant plurality of shapes more accurately reflect the concurrent existence of multiple adjacent or overlapping wind shear events.

Least Squares Shape Size Reduction

This process provides for a simple, efficient and mathematically rigorous method for more precisely indicating the hazardous microburst region. The original microburst shape algorithm—still used in the TDWR system, requires that all of the shear-segments 804 (the "runs of radial velocity increase") be enclosed within the microburst shape(s) 803. (FIG. 8) If the locus of these shear segments 804 is overly extended and/or fairly concave in geometrical structure, the "all enclosing" shape 803 can be too large. That is, it may contain non-hazardous regions 805. This can generate false alarm warnings as a runway alarm is generated when any portion of a microburst shape 803 intersects a predefined box 802 around a given runway 801. This same situation applied with the LLWAS microburst shapes. Where herein, we are concerned with overly extended and/or concave grid point clumps, as opposed shear-segment clusters, though the concept is identical. The solution to this documented "over-warning" problem has been developed in the context of the least-squares reduction of the shape-size for the LLWAS microburst shapes in the apparatus of the present invention.

A further contribution of the "overwarning" problem, is in the generation of the "magnitude" of the runway alert. That is, after a given microburst shape 803 intersects a "runway alert-box" 802, a magnitude for the alert must be computed. Again, the technique used for the TDWR stand-alone system is fairly simplistic and tends to over-estimate the hazard magnitude. These over-estimates are often viewed as false-alarms by the pilots. Therefore, again in the context of the LLWAS microburst shapes, a simple, efficient and mathematically rigorous methodology is used in the apparatus of the present invention. This algorithm employs a statistical estimate for a given microburst shape's magnitude.

A shape is defined by two axis end points: $(X_{e1}, Y_{e1})$ and $(X_{e2}, Y_{e2})$, $[X_{e1} \leq X_{e2}]$ and a radius R. (FIG. 7) The shape is generated initially by finding the line which, in a least squares sense, (weighted by magnitude) best fits the set of points in a given "clump". These clump points essentially reflect the divergence magnitude at those points in space— as estimated from the LLWAS wind field.

The radius is then found by an iterative procedure which minimizes the area of the shape while simultaneously requiring that all points in the clump are enclosed. This technique is identical to the procedure used for TDWR, which uses "segment endpoints" as opposed to "points in a clump". Next, we try to reduce the shape size so that it gives a better fit to the points. This is done because the original criteria that all points be enclosed, tends to result in overly-large shapes when the clump is fairly concave. A further undesired complication occurs because of the generally "weaker-magnitude" points on the edges of the clump. This can be conceptualized by considering a symmetrical microburst outflow. The clump points can be viewed as describing contour-levels of divergence. The "center" of the clump being the "center" of the microburst outflow. The highest level of divergence would be at the center of the microburst outflow, then monotonically decreasing in magnitude with increasing distance from the center. The shape's radius is first reduced, then the axis length. Both are done using a weighted least squares technique.

Reduction of the Shape Radius

What we do here is reduce the (weighted) distance of the (originally) enclosed points, $(X_k, Y_k)$, to the shape boundary.

We have that $R = d_k + \hat{d}_k$, where R is the original radius, $d_k$ is the perpendicular distance from the point to the shape axis (or axis endpoint if $X_k \leq X_{e1}$, or $X_k \geq X_{e2}$), and $\hat{d}_k$ is the distance from the point to the boundary.

Therefore, we minimize $\hat{d}_k = R - d_k$, which leads to the weighted least squares equation for R, the new radius:

$$\sum_{k=1}^{n} W_k(\bar{R} - d_k) = 0,$$

which has the solution:

$$\bar{R} = \sum_k W_k d_k,$$

when we choose a set of normalized weights $W_k$, $\Sigma W_k = 1$.
We define the weights to be:

$$W_k = \frac{m_k d_k}{\Sigma m_k d_k}$$

where $m_k$ is the given magnitude at each point. This weighing is used to remove the bias generated by the relative higher density of the internal points. This can be understood by considering a shape which is a disc, and whose constituent clump-points all have equal magnitudes. If the weighing function only considered magnitudes, then the least squares radius reduction would always attempt to make a new disc of minimal-radius. The use of the distance values in the weighing function is designed to counteract this tendency. Furthermore, we choose a coordinate system rotated such that the axis is horizontal.

$Y_j^* = Y_i^* \equiv \bar{Y}, X_k \rightarrow Xsubk^*, Y_k - Y_k^*$
(* indicating rotated coordinates)

In this coordinate system, the $d_k$'s are given by:

$$d_k = \begin{cases} [(X_{ksup}^* - X_{e1}^*)^2 + (Y_k^* - \bar{Y})^2]^{1/2}; & X_k^* < X_{e1}^* \\ |Ysubk^* - \bar{Y}|; & X_{1e}^* \leq X_k^* \leq Xsube2^* \\ [(X_k^* - X_{e2}^*)^2 + (Y_k^* - \bar{Y})^2]^{1/2}; & X_k^* > X_{e2}^* \end{cases}$$

Reduction of the Shape Axis Length

Next, we reduce the axis length by (separately) moving the axis segment endpoints toward the segment mid-point. We use a least squares reduction of the horizontal (in rotated coordinates) distance from a given point to the (closest) boundary. Note: the axis is reduced only when the axis length is longer than a threshold length (approximately 1 km). By "closest", we mean that the clump points are partitioned into three sets: a set whose X-coordinates are less than the shape axis segment's mid-point, $\bar{X}$; one "greater-than" $\bar{X}$; and a third set consisting of those points that (after radius reduction) are outside the shape. We do not use this third set of points since their (horizontal) distance to the boundary is (now) undefined.

$$X_b^* = \frac{X_{e1}^* + X_{e2}^*}{2}$$

Therefore, the problem we are trying to solve (for a generic endpoint "e") is:

$$d_k = d - (X_e - \hat{X}_e)$$

where $d_k$ is the horizontal (X*) distance from point k to the boundary; $\bar{d}$ is $_k$ the (eventual) least squares distance; $X_e$ and $\bar{X}_e$ are similarly the original and least squares endpoints.
The new endpoint we want is:

$$\hat{X}_e = \Sigma W_j(d_j - X_e)$$

where the set of points j refers to either points greater than $\bar{X}$ for the "right" endpoint or less than $\bar{X}$ for the "left" endpoint, respectively. The weights are chosen to be:

$$W_j = \frac{m_j|X_j^* - \bar{X}|}{\Sigma msubj|X_j^* - \bar{X}|}$$

where:

$$\Sigma W_j = 1$$

As before, the weights are chosen to reduce over-bias by points close to $\bar{X}$.

The horizontal (X)-distance to the boundary $d_j$ is given by:

$$d_j = L_j - \Delta X_j$$
$$= (\tilde{R}^2 - Y_j^{2*})^{1/2} - (X^*_j - X^*_e).$$

The value we want to minimize is then:

$$d_j - X_e^* = (\tilde{R} - Y_j^{2*})^{1/2} - X_j^*,$$

where $L_j$ is the horizontal distance from the point $(X_e^*, Y_j^*)$ to the least squares reduced boundary, and $\Delta X_j$ is the horizontal distance between $X_j^*$ and $X_e^*$:

$$L_j = (R^2 - Y_j^2)^{1/2}$$

(R is the least squares reduced radius)

$$\Delta X_j = X_j^* - X_e^*$$

Therefore, the new endpoint, $\overline{X}_e$ is given by (again in rotated coordinates):

$$\tilde{X}_e \Sigma W_j [(\tilde{R}^2 - Y_{jsup}^*2)^{1/2} - X_j^*]$$

where:

$$W_j = \frac{m_j|X^*_j - \overline{X}|}{\Sigma m_{subj}|X^*_j - \overline{X}|}$$

Note: the same values result for points between $\overline{X}$ and $X_e^*$, and $X_e^*$ and the boundary. Furthermore, the same result applies to points on either side of $\overline{X}$. That is, the same equations apply equally for both sets of points "j" (partitioned based upon being less than or greater-than $\overline{X}$).

LLWAS Microburst Shapes—Magnitude Computation

This routine computes an overall magnitude estimate for a given shape. The technique is to assume a Student's t-statistic distribution for the magnitudes for the set of points associated with the shape. The shape magnitude is then the percentile value given by the mean magnitude plus "K" standard deviations. This is an application of the well-known "confidence interval" technique from statistical theory. This distribution was chosen for its applicability to small sample sets and its approximation to a normal distribution for sample sets of around thirty elements or more. Furthermore, the value of "K" that has been used (k=1.0), was chosen to approximate an $80^{th}$ to $90^{th}$ percentile value over a wide range of degrees of freedom, (which is the number of points minus one).

Symmetry Test

Symmetry test apparatus 113 validates the microburst shapes produced by microburst shapes generator 112 based on the auxiliary information produced by the features aloft and shape information obtained from the Terminal Doppler Weather Radar System 502. This validation determines if there is supporting evidence that a given LLWAS microburst shape, is truly associated with a microburst. That is, the shape that is generated from the detection of surface wind field divergence can be associated with either a microburst or some other type of wind field anomaly, such as thermal activity, noisy winds, etc. Since symmetry assumptions are implicit in a generation of microburst shapes and these assumptions are based on the association of the surface divergence with the microburst. In non-microburst situations, these assumptions can lead to the generation of unwanted false alarms. This symmetry test procedure 113 removes the unwanted alarms by reviewing reflectivity and microburst precursor information from the Terminal Doppler Weather Radar system 502. These inputs are combined spatially and temporally to form symmetry disks whose presence indicates the possible existence of a microburst within or above its boundary. The given microburst shape that is to be validated by the symmetry test 113 is then tested for its proximity to a symmetry disk. Therefore, a weak microburst shape that is close to a symmetry disk is validated and those that are not are presumed to be an erroneous detection.

This symmetry test 113 is initiated at step 1301 with retrieval of site specific parameters from memory to modify the calculations based on local climatological conditions and sensor configuration. At step 1302, a rectangular grid in the xy Cartesian coordinate system is produced consisting of a minimal size grid necessary to analyze the calculated shapes. At step 1303 the microburst shapes are selected whose magnitude are equal to or greater than a site adaptable threshold. At step 1304 the present grid point values are computed based on current Terminal Doppler Weather Radar features aloft information and any Terminal Doppler Weather Radar or Low Level Wind Shear Alert System microburst shapes. The features aloft inputs are in the form of disks described by an xy center coordinate, a radius, and a type: low reflectivity, storm cell, reflectivity core or microburst precursor disks. A magnitude value for each of these features aloft disks is assigned based upon its type. The microburst shapes herein are those that have been filtered out previous to this routine and exceed the predetermined threshold values. Therefore, all of the Low Level Wind Shear Alert System and Terminal Doppler Weather Radar shapes computed are screened to come up with a composite set of shapes that exceed a given threshold value. For each disk that impacts the analysis grid that has been produced, specific grid points within that disk have their magnitude updated based on the nature of the disk. Each grid point magnitude value is time filtered with a single pole recursive filter to enforce a sense of time continuity. This set of filtered magnitudes is then the output of this routine to the create symmetry disks step 1305. The disk magnitudes are selected by appropriate choosing base or minimal values for each input set so that the features aloft disk type relates to the value of the actual loss magnitudes. Once these grid values have been established, at step 1305 the symmetry disks are created using a slightly modified version of the clump and shape generation algorithm discussed above. Once these shapes have been created at step 1305, at step 1306 the symmetry test is performed to validate the weaker Low Level Wind Shear Alert System microburst shapes. The LLWAS microburst shapes and symmetry disks are the input to this step. Any Low Level Wind Shear Alert System microburst shape whose magnitude is equal to or above a threshold value automatically passes the test. Otherwise, a circumscribing disk is created around each of these weak shapes and a test is performed to see whether a given Low Level Wind Shear Alert System disk is close to any symmetry disk. If it is, then that Low Level Wind Shear Alert System shape passes the test. The output of this process is a list of logical values for each of the input Low Level Wind Shear Alert System microburst shapes to indicate results of this symmetry test with a true value indicating that the shape has passed the test and is a valid for use in creating a microburst alert.

Microburst Integration

The microburst integration apparatus 114 is the driver of the microburst portion of the integration apparatus. This apparatus converts the Terminal Doppler Weather Radar microburst shapes and validated microburst shapes output by symmetry test apparatus 113 and the Low Level Wind Shear Alert System microburst shapes into runway specific alerts for any regions on the operational runways (arrival R1, departure R1, etc.) that are defined for the physical runways R1–R4 in the associated predetermined area which are affected by the shapes. The regions so affected are combined with the Low Level Wind Shear Alert System runway oriented loss alarms. The Low Level Wind Shear Alert System inputs to this microburst integration apparatus 114 are the runway oriented losses that are the outputs produced by the Low Level Wind Shear Alert System 101. The microburst integration apparatus 114 produces arrays containing the magnitude and location of any loss alarm as mapped onto the runway configuration within the predetermined area. The microburst integration apparatus 114 receives Terminal Doppler Weather Radar microburst shapes from the Terminal Doppler Weather Radar system 502 and converts these by mapping them into runway specific locus and magnitude indications to produce runway alarms. In addition, microburst shapes that are computed from the Low Level Wind Shear Alert System 101 as validated by the symmetry test apparatus 113 are also converted into runway alarms once they have sufficient magnitude or the symmetry hypothesis of symmetry test apparatus 113 substantiates their existence. In addition, any Low Level Wind Shear Alert System runway oriented losses, as produced by Low Level Wind Shear Alert System 101, that are concurrent with any Low Level Wind Shear Alert microburst shapes are converted into alarms and combined with the above noted Terminal Doppler Weather Radar microburst shapes and Low Level Wind Shear Alert System microburst shapes and output as a combination of alarms.

(1) Generation of Runway Specific Alerts:
(a) find alerts that would be generated individually by TDWR and validated LLWAS microburst shapes. This is done by the inherent TDWR logic which finds the intersection of a given shape with an "alert box" (nominally a rectangle around the operational runway path—½ nautical mile to either side and extending to 3 N.Mi off the runway end). This is done for each microburst shape. [The LLWAS-generated runway-oriented-loss (ROL) value(s) are only used when an LLWAS microburst shape is generated—but then not validated via the symmetry-test algorithm.] Then the overall alert for the given operational runway is computed by finding the "worst-case" magnitude and "first-encounter" location: from all the "interesting" shapes and the ROL's for the runway.

(2) Display Information:
(a) The above logic is for generating the runway alerts. That information is then relayed to the ribbon display terminals for the air traffic controllers, who then transmit it to any impacted aircraft. The same information is also displayed on the geographical situation display by "lighting-up" the appropriate runway locations.
(b) The TDWR and validated LLWAS microburst shapes are also displayed on the geographic display terminals.

The above-mentioned "worst-case" magnitude and "first-encounter" logic is further applied down-stream after the gust-front integration alerts are separately generated. That is, there can—and often is—multiple types of alerts for a given operational runway. Again, to avoid user-interpretation and confusion issues, only one alert is generated for a given operational runway at a given time. Therefore, the above logic is applied for all alerts for a runway. That is, alerts are separately generated for losses microbursts etc. and gains (gust fronts, etc.) then a single "worst-case" alert is generated. However, microburst alerts (losses $\geq 30$ knots) always take precedence. That is, if there is concurrently a 35 knot loss and a 45 knot gain—the 35 knot loss is used. This is because a wind shear that would generate a very hazardous loss (i.e. $\geq 30$ knots) is considered to be more significant for the aircraft.

Additional Data Acquisition Subsystems

The above description of the improved low-level wind shear alert system 100 is simply exemplary of the type of aviation weather apparatus that are available for use in implementing the virtual reality imaging system 10 in an aviation weather application. Additional data acquisition apparatus can include lightning detectors, gust front tracking systems, weather radar to identify the presence and locus of storm cells and precipitation, icing condition detection systems, aircraft tracking radar, etc. Each of these systems produce data indicative of the presence, locus, nature and severity of various meteorological phenomena of interest to aviation operations. In addition, topological data such as a LANDSAT image of the land surface within the predetermined multidimensional space is also available. Other spatial features of the multidimensional space, such as aircraft operations, restricted airspace, airport locations, etc. are also data inputs that are available in the form of static or dynamic data from existing instrumentation or input to graphics subsystem 2 as initialization data. In summary, there are numerous sources of the data relevant to the user's needs and the graphics subsystem 2 integrates these data sources and filters the received data to create a simplified image of the multidimensional space for the user to enable the user to perform a desired task without being overwhelmed by the quantity of data or without having to ignore major sources of data due to the user's inability to absorb and process the quantity of data that is available.

Graphics Subsystem Architecture

FIG. 1 also illustrates additional detail of an implementation of the graphics subsystem 2. The virtual reality imaging system 10 can serve a plurality of users, with each user defining a particular image set that is to be displayed. Therefore, the graphics subsystem 2 can be equipped with a number of graphics processing apparatus 31–3m or a single graphic processing apparatus can process data for multiple users. Each of graphics processing apparatus 31–3m receives data input from one or more data acquisition apparatus 21–2n in the form of raw data or compact data representations. The graphics processing apparatus 31–3m convert the received data into images as described below. The data processed by the various graphics processing apparatus 3* can be directly received from an associated data acquisition apparatus 2* and processes as received, or the data can be stored directly in database 3 for later retrieval and processing by the graphics processing apparatus 3. In either configuration, the graphics processing apparatus 3* operates on the data produced by the data acquisition apparatus 2*, whether the data is stored first in database 3 or processed as received then stored in database 3 in processed form.

Within a graphics processing apparatus 31, graphical object generator module 4 functions to convert the raw data or compact data representations received from an associated data acquisition apparatus 21 or from database 3 into graphical objects that are later manipulated to produce the required images. Each graphical object generator module 4 includes a plurality of graphical object generators 41–4k that are described in additional detail below. The graphical objects that are produced by a graphical object generator module 4 are stored in database 3, along with viewing data input by user interface 5. The user input interface 5 can be a simply terminal device such as a keyboard, to define a single user selected view, or can be a device to input a continuous stream of data indicative of a continuously changing user defined view. This latter device can be a set of sensors worn by the user that sense the user's head position to thereby enable the virtual reality imaging system 10 to present the instantaneous virtual field of view to the user that is presently in the user's field of vision.

Figure 19:
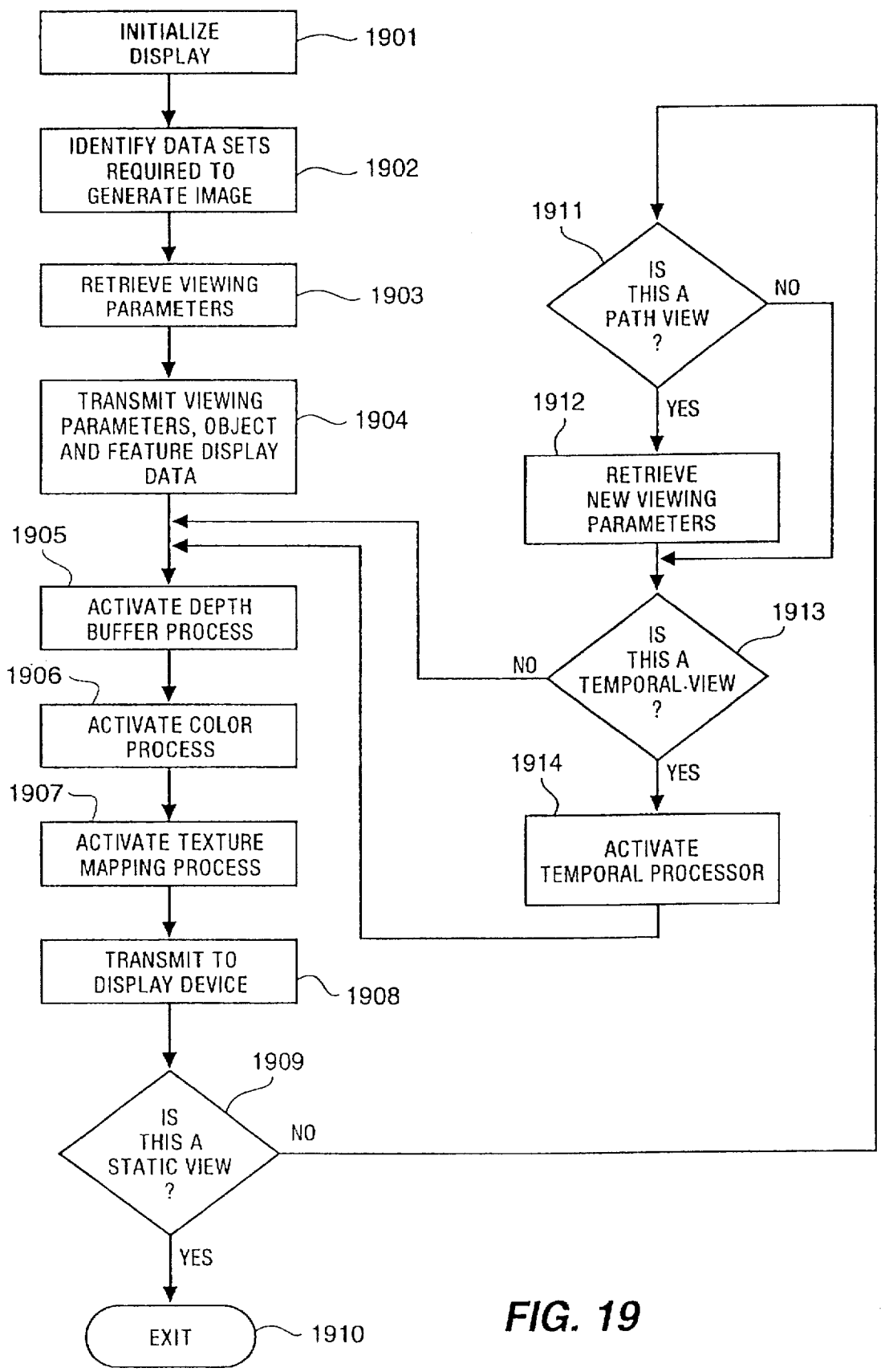
FIG. 19 illustrates in flow diagram form the operation of the presentation subsystem.

The database 3 is also connected to presentation subsystem 6 that converts the data stored in database 3 into a visual image for the user as illustrated in flow diagram form in FIG. 19. Presentation subsystem 6 includes element 301 which functions at step 1901 to initialize the visual display that is to be produced for the one or more users. This function clears the processing elements that comprise the graphics processing apparatus 31 and determines at step 1902 which of the sets of data sets contained in database 3 are to be used to produce the graphic images for the selected user. Element 302 determines which characteristics or parameters of the data contained in the database 3 are to be displayed to this particular designated user. This is accomplished by determine viewing parameters element 302 retrieving at step 1903 the filter parameters from user interface definition section 3A of data base 3 that define the objects and features that are of interest to this user. The determined parameters are then transported at step 1904 along with the raw data obtained from database 3 to the render graphical objects element 303 which performs the data merging, transposition and whatever other processing steps are required to produce the visual image. The image that is produced by the render graphical objects element 303 is then transmitted by the appropriate transmission media to the display 11 that corresponds to the particular user.

Image Presentation

Examples of the views that are created by this apparatus are illustrated in FIGS. 13–17. These views are in the context of an airport weather system, wherein the displays illustrate an overview of the weather in a predetermined space, as viewed from above in FIG. 13 and in successive views of FIGS. 14–17 that are presented to a pilot or an air traffic controller illustrating the flight path taken by an aircraft to approach and line up with a particular selected runway 79 at the airport. As can be seen from these views, there are a plurality of weather phenomena in the multidimensional space. The weather phenomena include wind shear events 91–98, thunderstorms P and gust fronts G. The display illustrates not the phenomena per se but filtered versions thereof that indicate to the pilot of the aircraft only the significant features thereof in order to enable the pilot to avoid any sections of this phenomena that are dangerous to the operation of the aircraft. In particular, the thunderstorms P may include wind shear events 91–98 that are extremely dangerous for aircraft operations. The view from the cockpit of the weather phenomena may be totally obscured due to rain, fog or clouds or snow and the illustrations provided in FIGS. 13–17 are indicative of how these visually obscuring events can be eliminated by the apparatus of the virtual reality imaging system 10 to provide the pilot with a clear indication of the existence of hazards, some of which may not be visually detectable by the naked eye, in the path of the aircraft or adjacent thereto. The pilot can therefore avoid these hazards using the virtual reality presented by the apparatus of the present invention. By flying along the clear flight path as indicated by the display, the pilot can avoid all weather phenomena that are obscured by the visually occluding phenomena without having to be instructed by the air traffic controllers. Furthermore, the air traffic controllers or the pilot can make use of the capability of this system to visually determine a proposed flight path through the weather to identify preferred routes for aircraft operations. This capability can be initiated via user interface 5, wherein an air traffic controller moves a cursor on the screen of a display, such as 11, or types an aircraft identifier on a keyboard to select one of the plurality of aircraft A in the multidimensional space. This aircraft selection is translated, using, aircraft position, altitude and heading data received from an aircraft tracking radar data acquisition subsystem and stored in database 3, into a set of coordinates indicative of a point in the multidimensional space. A predefined field of view for an aircraft of a particular type is also retrieved from the database 3 and used to create the graphic image for the user.

An example of a visually obscuring event is precipitation. The range of intensity of precipitation can be divided into a plurality of categories, for example on a range of 0 (clear) to 6 (nasty). A level 1 precipitation is characterized by clouds and/or light rain that causes some minimum impact on visibility, such that aircraft flying through level 1 precipitation usually will rely on instruments for guidance rather that exclusively on visual guidance. Level 3 precipitation is characterized by clouds and moderate rain with a more significant impact on visibility. Lightning is possible in level 3 precipitation and often emanates form the higher level precipitation regions that are typically embedded in a level 3 region and can strike outside the higher level region. Aircraft can usually fly through level 3 precipitation but it is typically avoided whenever possible due to the air turbulence encountered therein. A level 5 precipitation region is characterized by clouds, heavy rain, and/or hail with lightning and heavy turbulence often present. A level 5 region of precipitation represents a region to avoid due to the hazards encountered in flying through this region.

In visually representing these various regions of precipitation, the level 1 iso-surface represents the rough "extent of the weather", while the higher level regions represent "weather impacted airspace" that lie within the level 1 region. The iso-surfaces that are displayed on display 11 can be opaque or semi-transparent. If opaque, only the lowest level precipitation iso-surface is displayed since the other higher level regions are nested inside of this iso-surface and cannot be seen. If a semi-transparent display is selected, then the nested regions of higher precipitation can be seen through the semi-transparent exterior iso-surface as darker iso-surfaces or regions displayed by an iso-surface of a contrasting color.

Rendering Process and Apparatus

The preferred embodiment of the virtual reality imaging system of the present invention makes use of weather phenomena as one of the objects displayed to the user. In order to better understand the operation of the graphics subsystem 2, the rendering of a microburst shape is described in additional detail. The concept of rendering is related to apparatus that creates a synthetic image of an object. The renderer apparatus creates a shaded synthetic image of the object based upon three-dimensional geometric descriptions, a definition of surface attributes of the object and a model of the illumination present in the space in which the object resides. The final image produced by the renderer apparatus is spatially correct in that surfaces are ordered correctly from the observer, and the surfaces appear illuminated within the scope of the illumination model. Surfaces may be displayed in a manner to enhance the texture of the surface to highlight that feature, or reflection images on the object can be displayed. Renderer 303 can be a separate processing element or can be software running on a processor shared by other elements displayed in FIG. 1. If an object is to be rendered, a description of the object is passed from database 3 to the renderer 303, where the object definition is merged with other so retrieved object definitions to create the image.

This apparatus functions in a manner analogous to the operation of a camera. The camera's position, aiming direction and type of lens must all be specified to produce the visual image. This information is created by determine viewing parameters element 302 from the data stored in database 3 by the user via user interface 5. The viewing parameters are used by the renderer 303 to determine the field of view of the camera and to delete objects or sections of objects that are obscured by the presence of other objects that are located closer to the camera and in the line of sight of the camera. As the camera moves along a path, the camera views the objects in a different perspective. The renderer 303 creates an image for each predefined interval of time and/or space as the camera traverses the path. It is noteworthy that the view direction need not be the same as the path direction. The view direction can be pre-calculated for each point or under user control in an interactive manner or even locked on a particular object in the multidimensional space, which object may be moving. Thus, the view direction may not be a static parameter.

The representation of each object in the predetermined multidimensional space can be accomplished by defining the object as an interconnection of a plurality of polygons and lines. For a polygon that comprises a triangle, its definition is accomplished by specifying the location in three-dimensional space of the three vertices of the triangle. The renderer 303 uses the data defining the three vertices to determine whether the two-dimensional space encompassed by the three sides of the triangle that interconnect the three vertices is within the field of view of the camera. If so the renderer must also determine whether the triangle is partially or fully obscured by other triangles already retrieved from the database, which triangles define the surfaces of other objects. Additional complexity is added to this task by the inclusion of color, texture, opacity as defining terms to the object. When the renderer 303 traverses all objects defined in the database and included within the field of vision, the graphical image is completed and the resultant image is transferred to the display 11.

A microburst graphical image comprises a collection of the primitive graphical objects, such as triangles and lines. If triangles are used to define the surfaces of a microburst, a plurality of triangles are assembled together to create a multi-faceted series of surfaces to project the image of a solid object. Data defining the vertices of each triangle and other relevant surface features, are stored in the graphical object segment of the database 3. When the renderer 303 traverses the database 3, it uses the data obtained from user interface virtual reality definition database 3A to identify the filter parameters that are used to define the objects and features that are of interest to the specific user. These filter parameters can be microburst magnitude, proximity to an airport runway or aircraft flight path, direction of movement, etc. The additional objects are also retrieved from the database 3, such as other aircraft, precipitation, gust fronts, terrain features, etc. Each object is defined in terms of the polygonal shapes and their location and extent within the predefined volume. Additional primitives can be included in this system, such as object transparency, native color, graphical representation color, etc.

Depth Buffer

Figure 18:
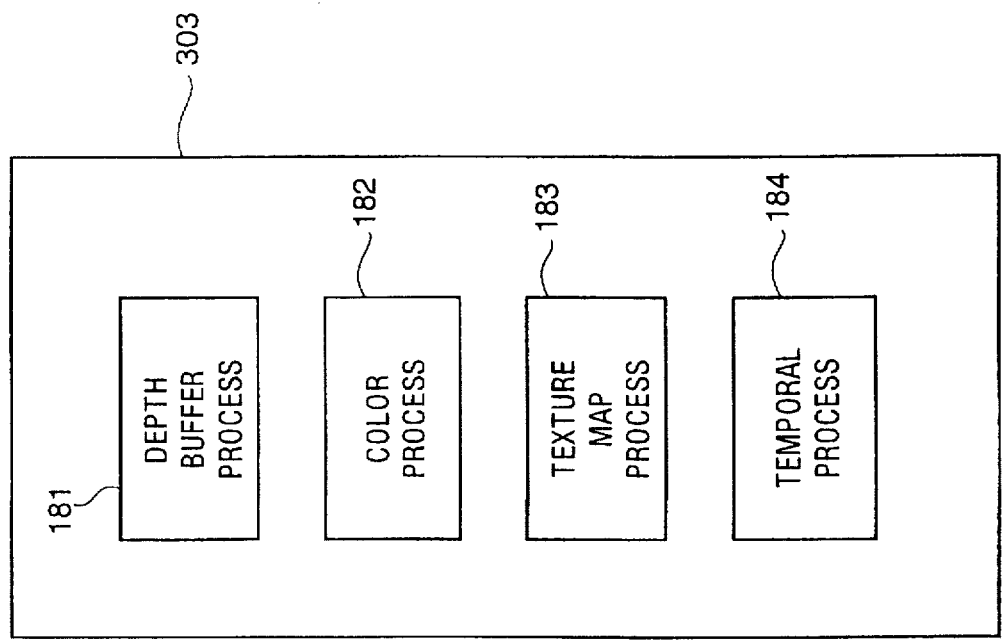
FIG. 18 illustrates additional detail of the renderer.

To illustrate the rendering of an image in further detail, the following description elaborates on typical image rendering concepts as related to the processing elements of renderer 303 that are disclosed in FIG. 18.

A fundamental element for image processing is a depth buffer 181 that is used at step 1905 to characterize an object in the multidimensional space that is displayed to the user. In depth buffer processing, each pixel that is stored in memory contains not only data values that describe the color assigned to this pixel, but also data values that are termed a "depth" parameter. The depth parameter is a measure of the distance from the viewer's eye to the spot on the object represented by this pixel. On system initialization, all the pixel color values are set to the background color and the depth parameters are set to the maximum value. This set of data represents an "empty stage", wherein the user is presented with a view of the multidimensional space absent any objects present therein. As each object is added to the multidimensional space, it is rendered pixel by pixel, and the depth value of each pixel is computed and compared to the depth value stored in the memory. If the newly computed depth value is less than the depth value presently stored in memory for this pixel, a determination is made that the newly rendered object is in the foreground, closer to the viewer than the previously rendered object that is presently represented by the pixel. The color and depth values for this pixel are then updated to those computed for the newly rendered object. If the depth value for the newly rendered object is greater than the value presently stored in memory, then the newly rendered object is in the background behind the previously rendered object and no change is made to the pixel values.

The result of this seriatim computing process is a bit map of pixel values, which represents a displayable image that shows the front surfaces of the front-most objects in the multidimensional space. The objects appear solid to the viewer and all hidden surfaces are suppressed. The resultant image clearly represents the spatial relationship among the objects.

The computation of depth values is fairly simple and can be performed in real time by dedicated hardware. This process is fast but requires an extensive amount of memory. In addition, this process does not address the issue of shadows, transparent or reflective objects.

Color Determination

The depth rendering process only determines the geometric position of objects in the space. The color assigned to each pixel is a function of the lighting, viewing geometry, and the object's visual surface properties. One method of color allocation is termed the Phong lighting model. The color definition process 182 at step 1906 makes use of a number of variables that define the object's surface and environment. These environment variables include a unit surface normal vector, which is a vector that is perpendicular to the surface of the object at the point where the color of the object is being evaluated. The unit eye vector is a vector from the viewer's eye to the point on the object's surface where the color of this object is being evaluated. Finally, the unit light vectors are vectors from the point on the object's surface where the color is being evaluated to each light source of the multidimensional space that illuminates the object. The object surface variables include the base color of the object and diffuse color, which is the color of the reflection component that is scattered equally in all directions. The specular color is the color of shiny highlights and need not be the same as the diffuse color. Finally, the specular exponent is a scalar value that controls the "tightness" of the highlights, as a diffuser lens intensity.

Texture Mapping

Texture mapping is a set of techniques 183 that increase the visual detail at step 1907 of computer images. These techniques add surface detail at step 1907 to geometric objects without specifically modeling those details using additional geometry. The increased detail is accomplished by mapping a predetermined image (texture map) on to the object's surface. The predetermined image is itself stored in memory as a two-dimensional or three-dimensional table of sampled data. As each pixel of the object surface is computed, selected elements from the texture map are used to replace or alter some material properties of the primitive object.

The texture mapping process follows a plurality of steps, starting with a texture synthesis step which produces the texture map data. This step can be performed prior to object rendering or during object rendering. Once the texture map is produced, the selected point on the primitive object is parameterized to uniquely identify the location of the selected point in the texture space. The texture map is accessed using the data that uniquely identifies the selected point and the corresponding texture at that point on the texture map is returned and used to alter the selected property of the object. This texture mapping process is described in terms of applying a discrete texture map to an object image.

These techniques can all be used to enhance the image presented to the user. The image processing can be performed at a central location and the final image data transmitted to the display device or the processing can be distributed, with compact data representations of the objects being transmitted to the display device along with the object surface characteristic data noted above. The display device can then assemble the image from the received data. In either case, the compact data representation of an object, such is that described above, reduces the quantity of data that must be transmitted, stored and processed.

At step 1908 the generated image data is transmitted to the selected display device 11 for presentation to the user. At step 1909, a determination is made of whether a single static image is to be presented to the user or a series of views taken along a defined path through the multidimensional space and/or over a length of time or at a future time. If a single static view is desired, processing exits at step 1910. If a sequence of images is desired, processing advances to step 1911 where a determination is made whether the sequence of images represents the view as seen from a path through the multidimensional space. If not, processing advances to step 1913.

The path definition occurs at step 1912 where the path definition processing is accomplished via one of a number of possible methods. The path can be defined in its totality so that the path definition operation simply redefines the user viewing parameters to identify the next point along the path at which an image is to be presented to the user. This view point selection is typically a function of the speed of image processing and whether the user desires a slow motion view or "real time" view. In addition, if the end of the path is reached, processing exits at step 1910. Alternatively, the path can be dynamically defined by the user via a "joystick" type of input device to "fly" a path through the multidimensional space. In this instance, at step 1912, the input device is queried to identify the next viewing point desired by the user. Once a viewing point is selected, processing advances to step 1913.

At step 1913, a determination is made whether a present view or time sequenced view is desired by the user. A selection of present view results in processing advancing to step 1905 where the image generation proceeds as described above. If a time sequenced view is elected, processing advances to step 1914 where the image data is manipulated. The user can select from a number of possible temporal views. A replay of past views or future views or a combination of past-present, present-future, past-present-future views are possible. Temporal processing step 1914 is typically implemented in temporal processor 184, which can maintain a buffer of n last most recent views, as defined using the compact data representation for view replay purposes. In addition, temporal processor 184 can extrapolate past and present image data to create a view of the multidimensional space at a point in the future. Temporal processor 184 manipulates the available data at step 1914 to produce data indicative of the state of the various objects extant in the multidimensional space at the selected point in time. This temporally adjusted data is then used at step 1905 and the following image processing steps to produce the image desired by the user.

Compact Data Representation Conversion To
Object Model

Figure 8:
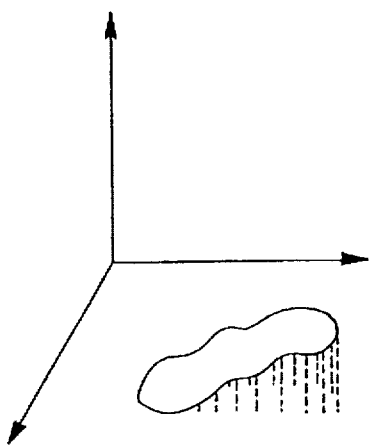

In order to illustrate the use of polygonal shapes to define object surfaces, the microburst shapes described above are illustrated in three-dimensional form. The compact data representation of the microburst shown in FIG. 8 is a band-aid shaped two-dimensional region on a surface that is used to indicate the location and extent of an aviation hazard. This shape can be defined in terms of two points and a radius as noted by their Cartesian coordinates—($X_{e1}$, $Y_{e1}$) and ($X_{e2}$, $Y_{e2}$), and a radius R where the Cartesian Coordinate system is defined in relation to the multidimensional space. The magnitude of the wind shear in this microburst is additional data that defines this wind shear event and may not be used initially to produce a representation of the wind shear event, since as described above, all wind shear events in excess of a predetermined magnitude are considered to be a hazard and should be displayed. However, the user's filter definition may include microburst severity parameters that modulate the standard wind shear event threshold data to display more or fewer microbursts, as a function of the user's filter. In addition, the microbursts can be color-coded to indicate their intensity.

Figure 7:
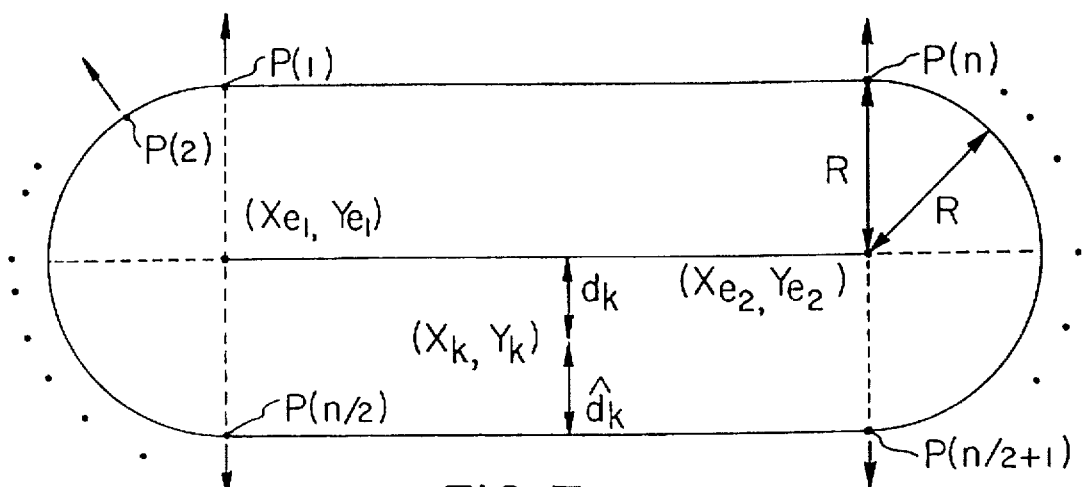
FIGS. 7–12 illustrate an example of converting the compact data representation of a phenomena to a three-dimensional object representation.

A microburst is a surface related phenomena, in that the aircraft hazard only exists when the aircraft is in close proximity to the ground, such as in a final approach to an airport runway or immediately upon takeoff. However, a graphical image of the microburst must have three-dimensional extent to ensure that the user can visually detect its presence in the display 11, especially when viewed from an obtuse angle. The compact data representation of a microburst as shown in FIG. 7 provides a two-dimensional definition of the surface locus and extent impacted by the microburst. The surface is typically not featureless and this two-dimensional compact data representation must be translated into a three-dimensional representation of the event. Therefore, the database 3 is queried to obtain topological data that defines the surface feature in and around the microburst impact area. The renderer 303 maps the two-dimensional locus and extent data into a three-dimensional representation of the actual surface area impacted by the microburst as illustrated in FIG. 8. In addition, there can be a spreading effect at the surface and the microburst may be illustrated in a manner that the top of the microburst is slightly smaller than its extent at the surface, somewhat like a plateau. Surface detail can be added to the three-dimensional rendering of the microburst using the texture surface technique disclosed above. The surface detail can also be varied as a function of the user selected threshold to highlight phenomena of significant interest to the user.

FIGS. 7–12 illustrate details of the method used by this apparatus to convert the two-dimensional compact data representation of a microburst into a three-dimensional graphic image representation. In FIG. 7, the two-dimensional band-aid shape is represented, including n datum points $P_i$ and surface normals representative of the two-dimensional tangent vector at each datum point on the curve. Once each datum point is identified, its location on the three-dimensional surface is defined such that $P_i=(x_i, y_i, z_i)$. The series of datum points can then be illustrated diagrammatically in FIG. 8 as a perimeter line that follows the topology of the surface to include the locus and extent defined by the two-dimensional band-aid shape. The series of datum points so defined in three-dimensional space each have the property that two data components $(x_i, y_i)$ define the datum point location on the band-aid perimeter in two-dimensional space. A third component defines the height of the datum point above a base level in the multi-dimensional space. The normal vectors generated for each datum point define the "outward" direction of the surface of the microburst at that datum point. The normal vectors can be used for shading and to provide the appearance of a smooth surface.

Figure 9:
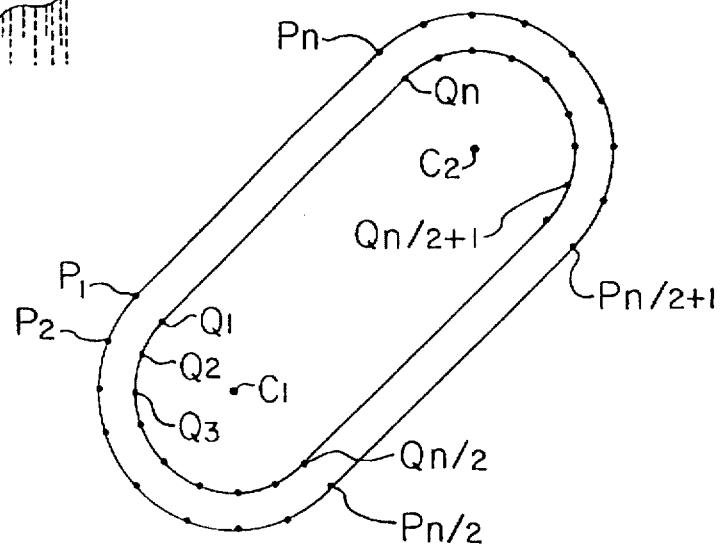
Figure 10:
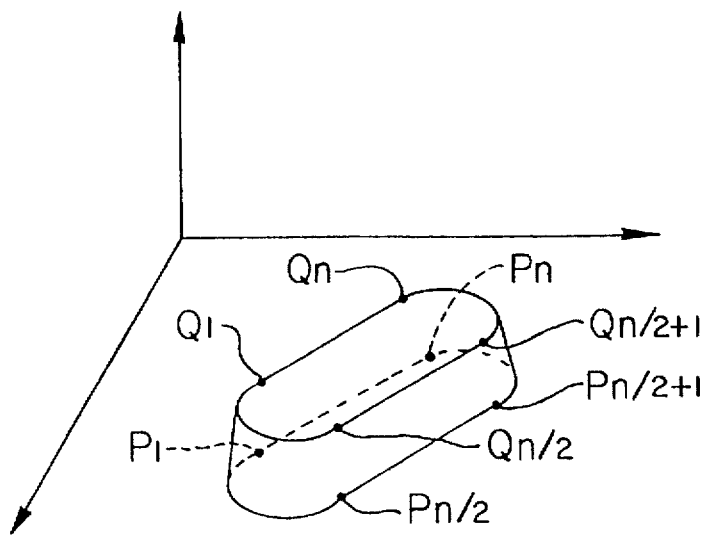

Once the series $P_i$ of datum points are defined as described above, a second series of datum points $Q_i$ are defined in three-dimensional space to define the top perimeter of the microburst. FIG. 9 illustrates the relationship of the first and second series of datum points in two-dimensional space. The second series of datum points are selected so that their perimeter defines a band-aid shape of locus and extent less than that of the perimeter defined by the first series of datum points so that the second series are inscribed within the first series of datum points. The third component of each datum point in the second series of datum points is selected to be a fixed height above the surface location of a corresponding datum point in the first series of datum points. The resultant three-dimensional shape is illustrated in FIG. 10 and resembles a plateau whose top surface follows the contours of the surface on which it rests.

Figure 11:
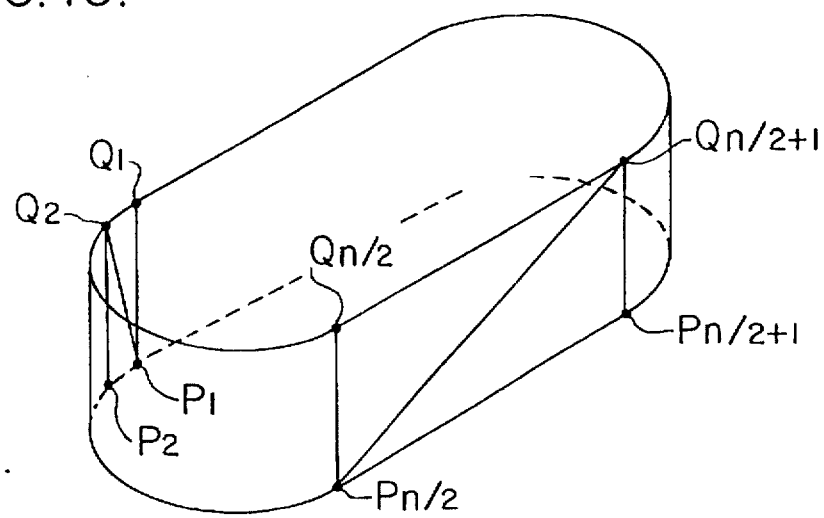
Figure 12:
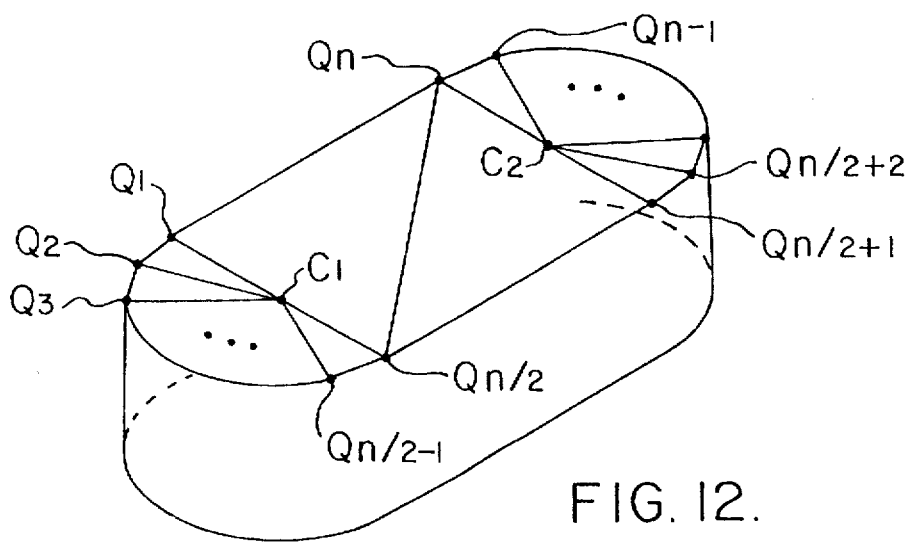

To enable the renderer to perform its task, the microburst shape defined by the two series of datum points are converted to a plurality of surface defining polygons. FIG. 11 illustrates the definition of one side surface of the microburst while FIG. 12 illustrates the definition of the top of the microburst. In particular, in FIG. 1, a triangular segment of surface 1 results from connecting the two series of datum points with lines that define the edges of triangle. A first triangle is defined by connecting points $(P_1, Q_1, Q_2)$ while a second triangle is defines by connecting points $(P_1, P_2, Q_2)$. This process is continued until the last defined triangle connects to the original or starting points $P_1, Q_1$. A similar process is used to define the top of the microburst shape.

The exterior surfaces of the microburst are thus defined by a series of triangles, each of which is precisely located within the multidimensional space by the Cartesian Coordinates of the vertices of each triangle. The renderer can then use the vertices and the surface normal vectors to denote surfaces in the field of vision of the user and to represent the obscuration of one object by another. Once the field of vision is thus defined, the additional attributes of the various objects are used in conjunction with the user-defined filters to transform the visual image into the virtual reality defined by the user. In particular, the types of objects displayed can be defined by the user to eliminate the visually obscuring effects of precipitation, or fog, or clouds. In addition, the surface defined by the triangles and the surface normal vectors can be visually displayed using shading as a function of the magnitude and direction of each surface defining vector to provide the user with an accurate three-dimensional solid representation of the object. Furthermore, time sequential values for the location of each datum point can be used to provide a "moving image" representation of the object to illustrate its movement in the multidimensional space over a number of time-sequential time intervals. This time series of data points can also be extrapolated to predict the future movement of the microburst. As can be seen from this example, the microburst can be defined by the compact data representation, which can then be expanded to create a three-dimensional rendering of the object for display to the user.

Display Example

Figure 13:
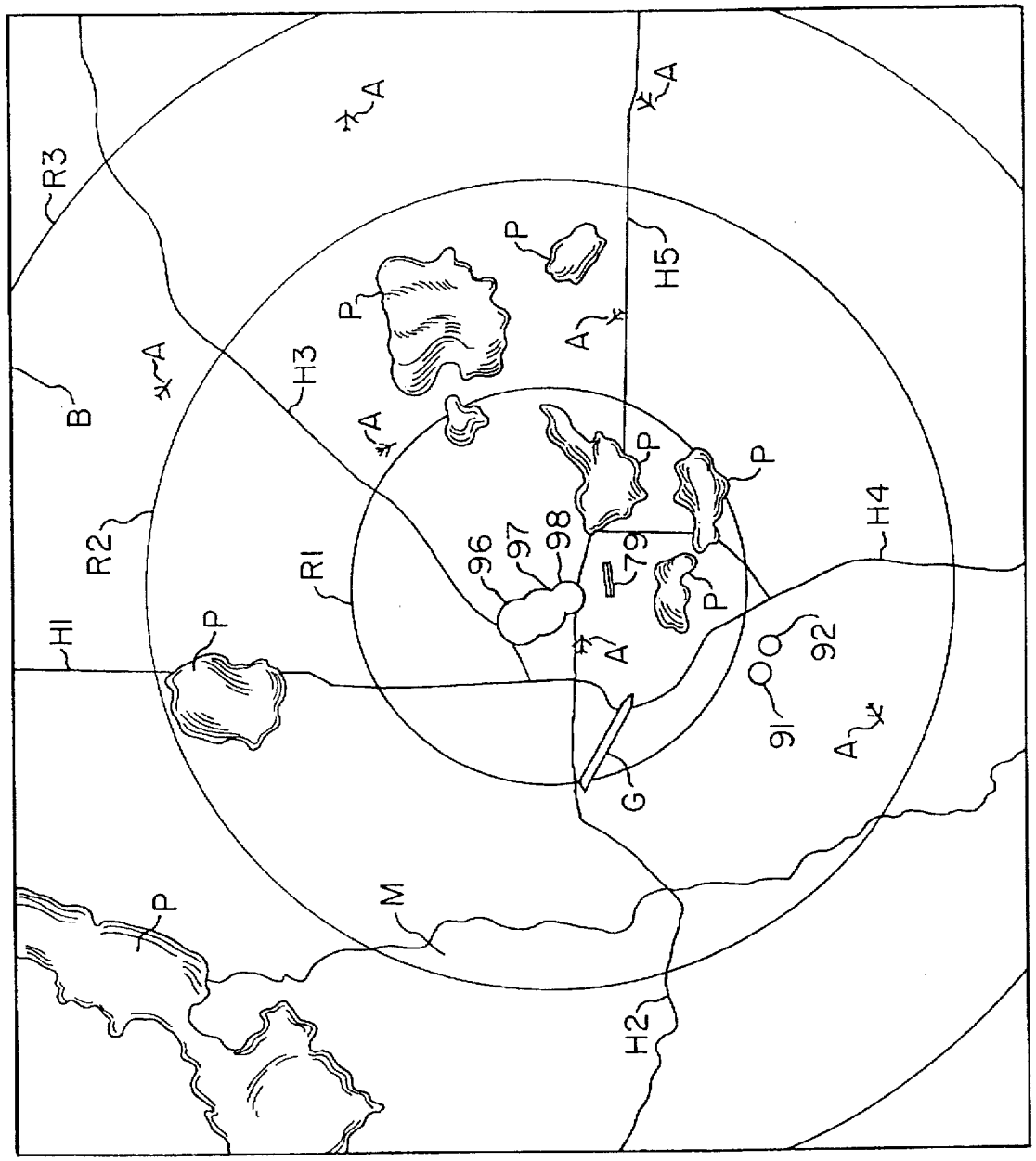

FIGS. 13–17 illustrate an example of a series of displays that can be used in an aircraft weather display application of the virtual reality imaging system 10. FIG. 13 illustrates a top view of a predetermined space, which view includes a plurality of features and phenomena. The predetermined space is delineated by boundary lines B and range circles R1–R3 can be included to denote range form a predetermined point located in the predetermined space. Temporally constant features located in this space are roads H1–H6 and natural topological features, such as mountains M. Other features shown on FIG. 13 are airport runway 79 and aircraft A. Temporally and spatially varying phenomenal that are present in this space are regions of precipitation P, wind shear events 91–98, and gust front G. Collectively, these elements represent the items of interest to aircraft operations in the predetermined space. It is obvious that a level of precipitation is selected for the operation of display 11 to delineate in FIG. 13 only the extent of the selected level of precipitation to minimize the complexity of the display shown in FIG. 13. This feature enables the viewer to minimize the extent of the precipitation regions displayed to only the levels of interest. For example, if only level 3 or higher regions of precipitation are displayed, then the visual obscuration presented by the level 1 and 2 precipitation are deleted from the display thereby enhancing the visibility for the viewer, such as a pilot.

Figure 14:
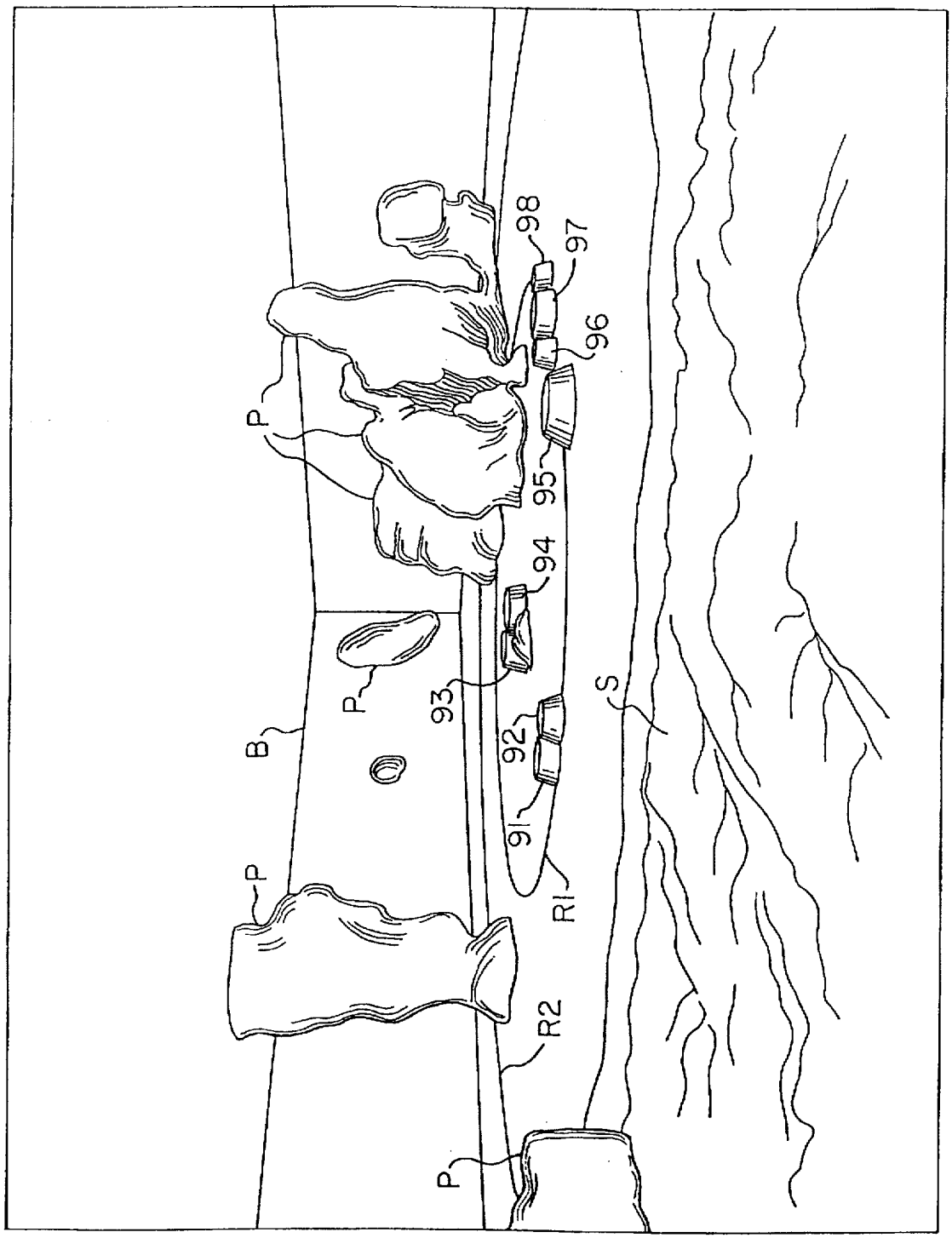

A more useful display for a pilot is shown in FIG. 14 where the used via user interface 5 defines a point in the predetermined space and a field of view. This data is translated into a perspective three-dimensional type of display to illustrate the view from the selected point, with the obscuring data filtered out by the renderer 303. As noted above, the low level precipitation and other aircraft A can be removed from the view and only objects of interest displayed thereon. The display thereby presents an image of the potentially threatening weather phenomena that confronts the pilot, in the form of precipitation P of at least level 3, wind shear events 91–98 and surface topology S. Note that the boundaries B of the predetermined space are also shown to indicate the extent of the data present in the field of view. As the aircraft decreases its altitude and approaches the runway 79, the field of view and point in the predetermined space change as the aircraft traverses the flight path. The virtual reality imaging system 10 periodically samples the data to update the point in space, field of view as well as selected characteristics for display to create ever changing images, such as that shown in FIG. 15, as the aircraft traverses the predetermined space to circle the runway 79 an line up for an approach. The periodic sampling of the data relates to the rendering of the data stored in the database, not that every object is sampled at the same rate. The view on approach is shown in FIG. 16 where the runway 79 is clearly seen as are regions of precipitation P and wind shear events 96–98. These wind shear events 96–98 in reality may not be visible to the pilot and the display via a computer generated rendering provides the pilot with information of weather related phenomena that otherwise is unavailable. The pilot can determine the proximity of the wind shear events 96–98 to runway in deciding whether to continue the approach to runway 79. In addition, renderer 303 can be activated to extrapolate the existing data to illustrate a likely progression of wind shear events 96–98 that is likely to occur during the aircraft approach. This predicted scenario can be quickly displayed on display 11 to enable the pilot to determine the closest approach of wind shear events 96–98 during the entire landing operation. FIG. 17 illustrates a timewise sequential display following that of FIG. 16 to indicate the display that would be seen further along the flight path as the runway 79 is approached. This sequence of aircraft operation can be simulated in real time by the user providing flight path defining data via a joystick or other such control device to "fly" a proposed flight path through the predetermined space.

Replay Capability

The above-described system can also provide the user with replays of the sequence of displays that are described above. This enables the user to review the last displayed sequence of images and/or vary the perspective seen by the user. For example, the user may vary the filter characteristics to obtain a view of the multidimensional space with a display of different elements and element thresholds. The user can also vary the viewpoint and/or the path taken through the multidimensional space. The data stored in database 3 comprises the data acquired by the data acquisition apparatus 1, which can be stored in compact data representation format via operation of compact data representation apparatus 204 as described above. The use of the compact data representation minimizes the quantity of data which must be stored in database 3 to enable the virtual reality imaging system 10 to maintain a history file of a sequence of displays, representing a temporal succession of states of the multidimensional space. The user can therefore quickly access the database 3, redefine the desired images, and virtual reality imaging system 10 can produce the sequence of visual images that represent the user defined sequence.

Figure 21:
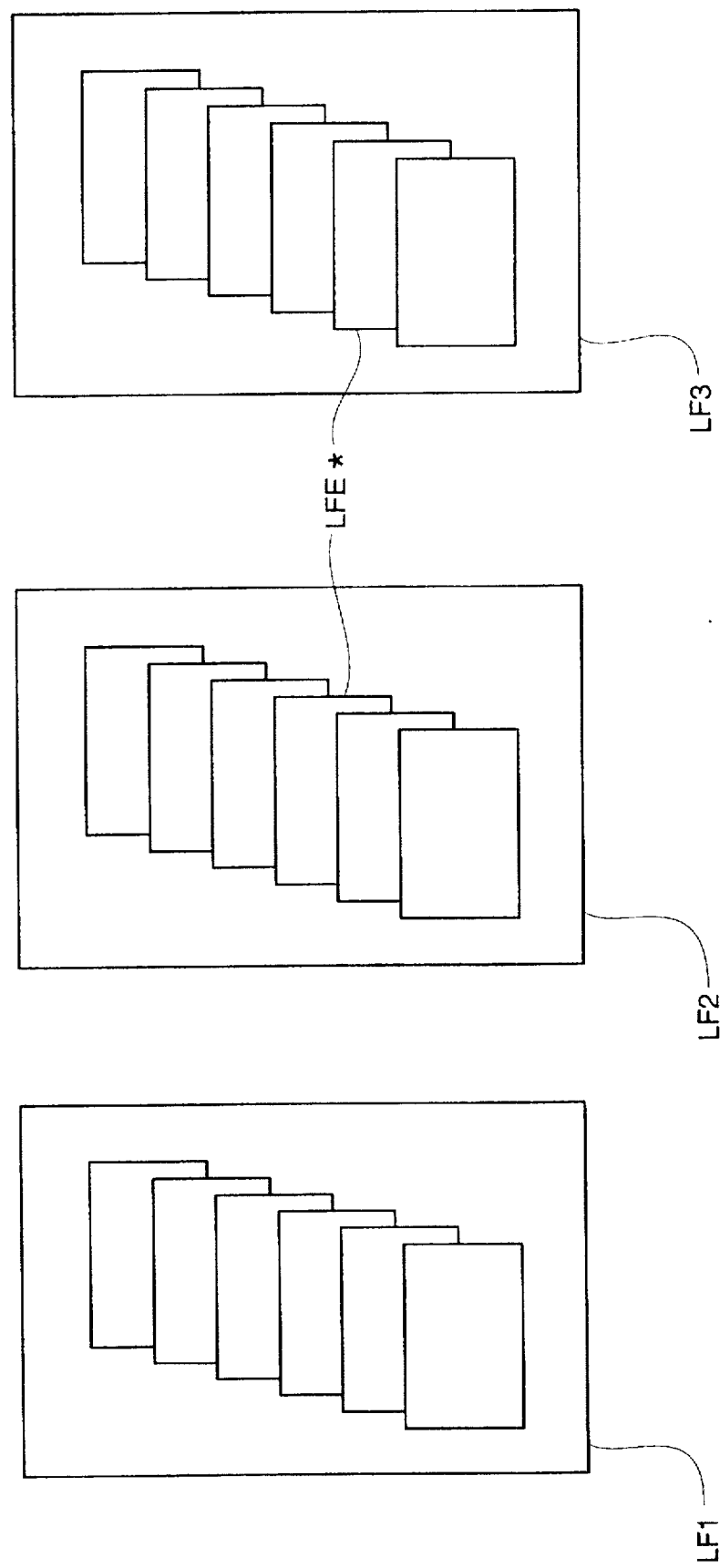
FIG. 21 illustrates the architecture of the database log files.

The system of the preferred embodiment of the invention utilizes data obtained at least in part from real time data sources, which comprise the data acquisition apparatus 1, wherein the data is being created on a continuous basis or on a continuing polled basis. Therefore, the data received from these various data acquisition apparatus 2* is logged into database 3 into files associated with each data acquisition apparatus 2*. There are typically a plurality of data acquisition apparatus 2* and the communication systems which interconnect the data acquisition apparatus 2* to the dd system 2 may vary in their operational characteristics. Therefore, database 3 implements a plurality of log files to store the data received from the various data acquisition apparatus 2*. The data is time stamped as it is received and identified so that each entry into a log file indicates the source of the data, the time that the data was generated and (if transmission latency is significant) the time that the data was received. FIG. 21 illustrates the overall architecture of the log files contained in the database 3 wherein a plurality of log files LF1–LF3 are present to store data received from three data acquisition apparatus 2*, with each log file LF* containing a plurality of time stamped data entries LFE1–LFEn. Thus, even though the data generation rate for the plurality of data acquisition apparatus 2* can vary, the data stored in database 3 can be temporally coordinated via the use of the time stamps associated with each log file entry. There is not necessarily a one-to-one correspondence among the data entries in the various log files and the time stamps enable the association of the most closely temporally related entries from the plurality of log files.

During playback of the images, the stored compact data representations are fed back into the graphics subsystem 301 in a coordinated fashion so that the compact data representations arrive at the graphics subsystem 301 at the same rate and intervals as they would in a real time mode. This enables the graphics subsystem 301 to produce a temporally displaced view of the real time system. The transmission of the compact data representations stored in database 3 to the graphics subsystem 301, the system can recreate the entire multidimensional space since the stored data contains all the information about the objects extant in the multidimensional space required to replicate the image available in the real time mode. This capability allows the replay system to recreate a visualization of the multidimensional space from arbitrary viewpoints at a later point in time.

A further advantage is that the replay system can speed up or slow down time in an arbitrary fashion. Since the stored data is time stamped, the graphics system 301 can either increase or decrease the intervals at which the stored data is retrieved and displayed to the user. The temporal coordination of the stored images includes the requirement that the graphics subsystem database 3 be populated with a replication of the most temporally current rendering of each desired object so that the baseline image presented to the user includes all the desired objects, not just those for which a temporally current image is stored at the startup time. This baseline image therefore represents the last generated image for a system which had been playing in run time mode up to the user designated startup time. Once the baseline image is created from the log file data, the temporally coordinated log file entries can be retrieved and used to update the display for the user.

Figure 20:
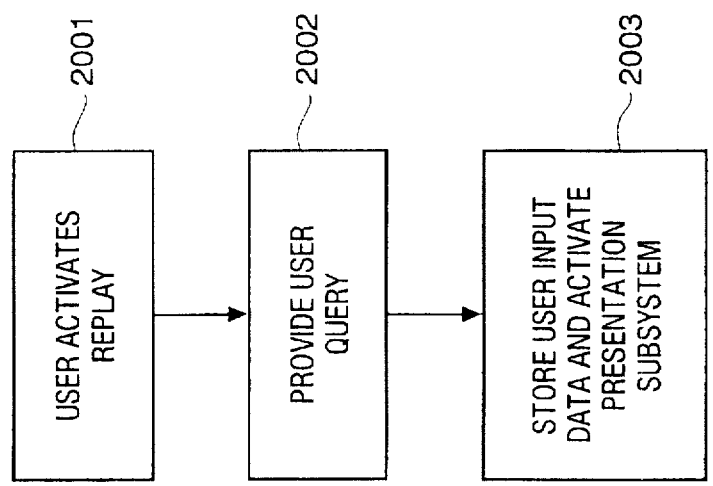
FIG. 20 illustrates in flow diagram form the operation of the replay apparatus.

FIG. 20 illustrates in flow diagram form, the operation of the replay capability of the virtual reality imaging system 10 of the preferred embodiment of the present invention. At step 2001, the user activates the replay capability via an input device, such as terminal 11. The virtual reality imaging system 10 at step 2002 provides the user with a query to enable the user to input data indicative of the user's desired display sequence. The query can be in the form of a screen display (not shown) having a plurality of fields for data entry by the user as is well known in the art. The data entry fields can include, but are not limited to:

Filter characteristics
Temporal sequence for display
Viewpoint (starting point)
Path through multidimensional space
Extrapolation/interpolation features
Granularity of display sequence (frames per unit time)
Presentation speed (slow motion, reverse, etc)

The user inputs the data necessary to define the visual sequence that the user wishes to have displayed on display terminal 11. For example, the user may wish to add additional detail to the visual images by reducing the thresholds defined for a number of the meteorological phenomena to thereby display less severe weather phenomena than initially selected in the first visual presentation. Furthermore, the user may select a different path from the same starting point to the airport runways 79 shown in FIGS. 13–17. Finally, the user can input data indicative of replaying the entire stored sequence of images corresponding to the last viewed sequence. The virtual reality imaging system 10 receives the user input data and at step 2003 activates presentation subsystem 6 to convert the data stored in database 3 into a sequence of visual images for the user as illustrated in flow diagram form in FIG. 19. Presentation subsystem 6 includes element 301 which functions at step 1901 to initialize the visual display that is to be produced for the one or more users. This function clears the processing elements that comprise the graphics processing apparatus 31 and determines at step 1902 which of the sets of data sets contained in database 3 are to be used to produce the graphic images for the selected user. Element 302 determines which characteristics or parameters of the data contained in the database 3 are to be displayed to this particular designated user. This is accomplished by determine viewing parameters element 302 retrieving at step 1903 the filter parameters from user interface definition section 3A of data base 3 that define the objects and features that are of interest to this user. The determined parameters are then transported at step 1904 along with the raw data obtained from database 3 to the render graphical objects element 303 which performs the data merging, transposition and whatever other processing steps are required to produce the visual image. The image that is produced by the render graphical objects element 303 is then transmitted by the appropriate transmission media to the display 11 that corresponds to the particular user. The remainder of the display process is documented above with respect to the description of FIGS. 13–19.

SUMMARY

As can be seen from the above examples, the virtual reality imaging system displays features and phenomena, that can be temporally and/or spatially varying, in a manner to filter out the characteristics of the features and phenomena that are not of interest to the viewer. The image presented to the viewer is a condensation of all the data collected by the plurality of data acquisition systems, and some of the data presented represents features or phenomena that are not visible to the viewer with the naked eye. Thus, this apparatus operates in real time to provide each user with a customized view of a predetermined space to enable the user to perform a desired task.

While a specific embodiment of this invention has been disclosed, it is expected that those skilled in the art can and will design alternate embodiments of this invention that fall within the scope of the appended claims.

I claim:

1. Apparatus for presenting a user with a virtual image of phenomena located in a predefined multidimensional space, comprising:

means for generating data indicative of at least one phenomena extant in a multidimensional space, which multidimensional space has predefined extent in a plurality of dimensions;

means for converting said generated data to a compact data representation of said at least one phenomena;

means for storing a plurality of said sets of said compact data representations, each set being indicative of an image of a temporally defined state of said at least one phenomena extant in a multidimensional space, said plurality of stored sets being representative of a time ordered sequence of said compact data representations;

means for storing data defining a plurality of characteristics of said phenomena that are to be displayed to a user;

means for extracting data, that satisfies said plurality of characteristics defined by said stored data, from said stored set of compact data representation; and means, responsive to said extracted data, for producing an image representative of a three dimensional view of at least a portion of said multidimensional space to display said phenomena.

2. The apparatus of claim 1 wherein said extracting means comprises:

means, responsive to user provided indicia, for accessing at least two of said plurality of sets of stored compact data representations.

3. The apparatus of claim 2 wherein said producing means produces a series of images from said at least two sets representative of said time ordered sequence of images of a three dimensional view of at least a portion of said multidimensional space to display said phenomena.

4. The apparatus of claim 3 wherein each of said stored compact data representations is time stamped to indicated time of origination of said compact data representation, said producing means uses said time stamp to retrieve temporally related ones of said compact data representations from said at least two sets to produce said time ordered sequence of images.

5. The apparatus of claim 2 wherein said extracting means further comprises:

means for enabling a user to redefine said stored data that defines a plurality of characteristics of said phenomena that are to be displayed to a user; and wherein said producing means produces a series of images representative of said time ordered sequence of images of a three dimensional view of at least a portion of said multidimensional space to display said phenomena.

6. The apparatus of claim 2 wherein said extracting means further comprises:

means for enabling a user to redefine said stored data that defines a plurality of characteristics of said phenomena that are to be displayed to a user; and wherein said producing means produces a series of images from said at least two sets representative of said time ordered sequence of images of a three dimensional view of at least a portion of said multidimensional space to display said phenomena.

7. The apparatus of claim 1 wherein said converting means generates data for said compact data representation indicative of a presence and locus of said at least one phenomena in said multidimensional space.

8. The apparatus of claim 7 wherein said converting means generates data indicative of an extent of said phenomena in said multidimensional space, said compact data representation defining exterior surfaces of said phenomena.

9. The apparatus of claim 8 further comprising:

means for storing data representative of at least one texture map, which texture map is indicative of features of a surface of said phenomena; and wherein said image producing means accesses data in said storing means corresponding to a selected one of said texture maps to produce said image.

10. The apparatus of claim 9 wherein said image producing means retrieves said data indicative of exterior surfaces of said phenomena concurrent with accessing data in said storing means corresponding to said selected texture map;

means for altering said surface to incorporate features of said texture map.

11. The apparatus of claim 10 wherein said image generation means converts said compact data representation data indicative of said exterior surfaces to a pixel by pixel image of said exterior surface of said phenomena.

12. The apparatus of claim 8 wherein said image generation means retrieves locus information of said phenomena from said compact data representation to define position of exterior surfaces of said phenomena in said multidimensional space.

13. The apparatus of claim 12 wherein said image producing means arbitrates among a plurality of phenomena to identify segments of exterior surfaces of ones of said phenomena to be represented in a foreground of a field of view from a user.

14. The apparatus of claim 13 wherein said image producing means combines said identified segments of exterior surfaces to present an inter-object spatial relationship view to said user.

15. A method for presenting a user with a virtual image of phenomena located in a predefined multidimensional space, comprising the steps of:

generating data indicative of at least one phenomena extant in a multidimensional space, which multidimensional space has predefined extent in a plurality of dimensions;

converting said generated data to a compact data representation of said at least one phenomena;

storing in a memory a plurality of said sets of said compact data representations, each set being indicative of an image of a temporally defined state of said at least one phenomena extant in a multidimensional space, said plurality of stored sets being representative of a time ordered sequence of said compact data representations;

storing in a memory data defining a plurality of characteristics of said phenomena that are to be displayed to a user;

extracting data, that satisfies said plurality of characteristics defined by said stored data, from said stored set of compact data representation; and producing, in response to said extracted data, an image representative of a three dimensional view of at least a portion of said multidimensional space to display said phenomena.

16. The method of claim 15 wherein said step of extracting comprises:

accessing, in response to user provided indicia, at least two of said plurality of sets of stored compact data representations, which at least two of said plurality of sets are representative of a time ordered sequence of images.

17. The method of claim 16 wherein said step of producing produces a series of images from said at least two sets representative of said time ordered sequence of images of a three dimensional view of at least a portion of said multidimensional space to display said phenomena.

18. The method of claim 17 wherein each of said stored compact data representations is time stamped to indicated time of origination of said compact data representation, said step of producing uses said time stamp to retrieve temporally related ones of said compact data representations from said at least two sets to produce said time ordered sequence of images.

19. The method of claim 16 wherein said step of extracting further comprises:

enabling a user to redefine said stored data that defines a plurality of characteristics of said phenomena that are to be displayed to a user; and wherein said step of producing produces a series of images representative of said time ordered sequence of images of three dimensional view of at least a portion of said multidimensional space to display said phenomena.

20. The method of claim 16 wherein said step of extracting further comprises:

enabling a user to redefine said stored data that defines a plurality of characteristics of said phenomena that are to be displayed to a user; and wherein said step of producing produces a series of images from said at least two sets representative of said time ordered sequence of images of a three dimensional view of it least a portion of said multidimensional space to display said phenomena.

21. The method of claim 15 wherein said step of converting generates data for said compact data representation indicative of a presence and locus of said at least one phenomena in said multidimensional space.

22. The method of claim 21 wherein said step of converting generates data indicative of an extent of said phenomena in said multidimensional space, said compact data representation defining exterior surfaces of said phenomena.

23. The method of claim 22 further comprising the step of:

storing data in a memory representative of at least one texture map, which texture map is indicative of features of a surface of said phenomena; and wherein said step of image producing accesses data in said memory corresponding to a selected one of said texture maps to produce said image.

24. The method of claim 23 wherein said step of image producing retrieves said data indicative of exterior surfaces of said phenomena concurrent with accessing data in said memory corresponding to said selected texture map; and further comprising altering said surface to incorporate features of said texture map.

25. The method of claim 24 wherein said step of image generation converts said compact data representation data indicative of said exterior surfaces to a pixel by pixel image of said exterior surface of said phenomena.

26. The method of claim 22 wherein said step of image generation retrieves locus information of said phenomena from said compact data representation to define position of exterior surfaces of said phenomena in said multidimensional space.

27. The method of claim 26 wherein said step of image producing arbitrates among a plurality of phenomena to identify segments of exterior surfaces of ones of said phenomena to be represented in a foreground of a field of view from a user.

28. The method of claim 27 wherein said step of image producing combines said identified segments of exterior surfaces to present an inter-object spatial relationship view to said user.

* * * * *